United States Patent
Imai et al.

(10) Patent No.: US 7,400,101 B2
(45) Date of Patent: Jul. 15, 2008

(54) METHOD FOR DETECTING ROTOR ANGLE OF DC BRUSHLESS MOTOR AND CONTROLLER OF DC BRUSHLESS MOTOR

(75) Inventors: Nobuyuki Imai, Wako (JP); Yutaka Takahashi, Wako (JP); Tomohiro Shiraishi, Wako (JP); Hajime Kondoh, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 280 days.

(21) Appl. No.: 11/246,242

(22) Filed: Oct. 11, 2005

(65) Prior Publication Data

US 2006/0082335 A1 Apr. 20, 2006

(30) Foreign Application Priority Data

Oct. 19, 2004 (JP) ............................... 2004-304492

(51) Int. Cl.
*H02K 29/00* (2006.01)

(52) U.S. Cl. ....................... 318/138; 318/254; 318/439; 318/432; 318/434; 318/542

(58) Field of Classification Search ................. 318/138, 318/254, 439, 432, 434, 542

See application file for complete search history.

(56) References Cited

U.S. PATENT DOCUMENTS

| | | | |
|---|---|---|---|
| 6,707,265 B2 | 3/2004 | Imai et al. |
| 6,812,659 B2 | 11/2004 | Imai et al. |
| 6,812,660 B2 | 11/2004 | Takahashi et al. |
| 6,838,843 B2 | 1/2005 | Imai et al. |
| 6,909,290 B2 | 6/2005 | Imai et al. |

FOREIGN PATENT DOCUMENTS

| | | |
|---|---|---|
| JP | 2004-048934 | 2/2004 |
| JP | 2004-048936 | 2/2004 |
| JP | 2004-072901 | 3/2004 |
| JP | 2004-120834 | 4/2004 |
| JP | 2004-222437 | 8/2004 |

*Primary Examiner*—Karen Masih
(74) *Attorney, Agent, or Firm*—Arent Fox LLP

(57) ABSTRACT

A method and an apparatus accurately detect a rotor angle of a DC brushless motor by using a first-order difference of a detected value of a phase current. A periodic signal causing the total sum of output voltages in three control cycles to become zero is superposed over a drive voltage under current feedback control. The drive voltage is held at a constant level during the three control cycles. The phase difference between an actual value and an estimated value of a rotor angle is calculated, using the first-order differential current in each control cycle, and the estimated value of the rotor angle is calculated by follow-up computation of an observer, using the phase difference.

8 Claims, 9 Drawing Sheets

|     | Vhu    | Vhv    | Vhw    |
|-----|--------|--------|--------|
| T11 | cos15  | cos135 | cos255 |
| T12 | cos135 | cos255 | cos15  |
| T13 | cos255 | cos15  | cos135 |

|     | Vhu    | Vhv    | Vhw    |
|-----|--------|--------|--------|
| T21 | cos15  | cos135 | cos255 |
| T22 | cos195 | cos315 | cos75  |
| T23 | cos105 | cos225 | cos345 |
| T24 | cos285 | cos45  | cos165 |

METHOD FOR DETECTING ROTOR ANGLE OF DC BRUSHLESS MOTOR AND CONTROLLER OF DC BRUSHLESS MOTOR

BACKGROUND OF THE INVENTION

1. Field of the Invention

The present invention relates to a method and an apparatus for detecting a rotor angle of a DC brushless motor by superposing a periodic signal over a drive voltage of the motor.

2. Description of the Related Art

To obtain a desired output torque from a DC brushless motor, it is necessary to apply a voltage to an armature at an appropriate phase that matches an electrical angle of a rotor having magnetic poles (hereinafter referred to as a "rotor angle"). There have been proposed various methods for detecting rotor angles without using position detecting sensors so as to achieve reduced cost of a DC brushless motor and a drive unit by obviating the need for the position detecting sensors for detecting rotor angles.

The inventors of the present application have proposed, in a previous application (refer to Japanese Unexamined Patent Application Publication No. 2004-120834), a method in which second-order differences of a d-axis current and a q-axis current are calculated by alternately conducting feedback control only on the d-axis current and feedback control only on the q-axis current, and an estimated value of a rotor angle is calculated by using a second-order difference when the feedback control of current supplied to a DC brushless motor is conducted by so-called dq vector conversion at every predetermined control cycle.

According to the aforesaid method, a sine reference value and a cosine reference value based on the double angle of a phase difference between an actual value and an estimated value of a rotor angle can be calculated by using a calculated value of a second-order difference of d-axis current and q-axis current. Thus, the rotor angle can be detected on the basis of the sine reference value and the cosine reference value.

As described above, the rotor angle of the DC brushless motor can be detected by calculating the second-order difference of the d-axis current and the q-axis current. However, if a second-order difference of the d-axis current and the q-axis current based on a detected value of a phase current is used, then it is expected that a greater detection error of phase current will result, as explained below.

If a detected value of the phase current at an n-th control cycle is denoted by I(n) and a detection error at that time is denoted by N(n), then a first-order difference $\Delta I$ and a second-order difference $\Delta\Delta I$ of phase current are given by the following expressions (1) and (2), respectively.

$$\Delta I = \{I(n)+N(n)\} - \{I(n-1)+N(n-1)\} \quad (1)$$

$$\Delta\Delta I = \{I(n)+N(n)\} - 2\{I(n-1)+N(n-1)\} + \{I(n-2)+N(n-2)\} \quad (2)$$

If the error N(n) at detection of a phase current is assumed to be a white noise (zero on the average) indicating no correlation to each other, then a variance of the first-order difference (the expected value of a squared error from a mean value) $E_1$ and a variance $E_2$ of the second-order difference are given according to the following expressions (3) and (4) when the variance of error is denoted by $\sigma_n$.

$$E_1 = \langle \{\Delta I - \Delta\bar{I}\}^2 \rangle \quad (3)$$
$$= E(\Delta I^2) - \Delta\bar{I}^2$$
$$= E([\{I(n) + N(n)\} - \{I(n-1) + N(n-1)\}]^2) - \{\bar{I}(n) - \bar{I}(n-1)\}^2$$
$$= 2\sigma_n$$

$$E_2 = \langle \{\Delta\Delta I - \Delta\Delta\bar{I}\}^2 \rangle \quad (4)$$
$$= E(\Delta\Delta I^2) - \Delta\Delta\bar{I}^2$$
$$= E([\{I(n) + N(n)\} - 2\{I(n-1) + N(n-1)\} + \{I(n-2) + N(n-2)\}]^2) - \{\bar{I}(n) - 2\bar{I}(n-1) + \bar{I}(n-2)\}^2$$
$$= 4\sigma_n$$

Thus, it is expected that there will be less influences of the detection error N(n) if the first-order difference is used rather than the second-order difference.

SUMMARY OF THE INVENTION

Accordingly, it is an object of the present invention to provide a method and an apparatus for accurately detecting a rotor angle of a DC brushless motor by using a first-order difference of the detected value of a phase current.

First, before explaining the present invention, the fundamental concept on which the present invention is based will be described with reference to FIG. 1. FIG. 1 schematically shows the construction of a DC brushless motor 1. When a salient-pole rotor 2 is used, the relationship between voltages $V_u$, $V_v$, and $V_w$ applied to armatures 3, 4, and 5 of three phases (U, V, and W) and passing currents $I_u$, $I_v$, and $I_w$ of the motor 1 is represented by the following expression (5).

$$\begin{bmatrix} V_u \\ V_v \\ V_w \end{bmatrix} = r \begin{bmatrix} I_u \\ I_v \\ I_w \end{bmatrix} + \frac{d}{dt}\begin{bmatrix} l - \Delta l\cos 2\theta & m - \Delta l\cos\left(2\theta - \frac{2}{3}\pi\right) & m - \Delta l\cos\left(2\theta + \frac{2}{3}\pi\right) \\ m - \Delta l\cos\left(2\theta - \frac{2}{3}\pi\right) & l - \Delta l\cos\left(2\theta + \frac{2}{3}\pi\right) & m - \Delta l\cos 2\theta \\ m - \Delta l\cos\left(2\theta + \frac{2}{3}\pi\right) & m - \Delta l\cos 2\theta & l - \Delta l\cos\left(2\theta - \frac{2}{3}\pi\right) \end{bmatrix} \begin{bmatrix} I_u \\ I_v \\ I_w \end{bmatrix} + \omega_{re}K_e \begin{bmatrix} \sin\omega t \\ \sin\left(\omega t - \frac{2}{3}\pi\right) \\ \sin\left(\omega t - \frac{4}{3}\pi\right) \end{bmatrix} \quad (5)$$

where $V_u$, $V_v$, $V_w$: Voltages of individual phases; $I_u$, $I_v$, and $I_w$: Currents of individual phases; r: Phase resistance; Ke: Constant of induced voltage; l: Self-inductance of armature; m: Mutual inductance of armature; $\theta$: Rotor angle; and $\omega_{re}$: Angular velocity.

If the rpm of the motor 1 is substantially zero, there are minimum influences caused by changes in induced voltage or rotor angle, and the voltage attributable to phase resistance is negligibly small, then the above expression (5) can be approximated by the following expression (6).

$$\begin{bmatrix} V_u \\ V_v \\ V_w \end{bmatrix} \approx \quad (6)$$

$$\begin{bmatrix} l - \Delta l\cos2\theta & m - \Delta l\cos\left(2\theta - \frac{2}{3}\pi\right) & m - \Delta l\cos\left(2\theta + \frac{2}{3}\pi\right) \\ m - \Delta l\cos\left(2\theta - \frac{2}{3}\pi\right) & l - \Delta l\cos\left(2\theta + \frac{2}{3}\pi\right) & m - \Delta l\cos2\theta \\ m - \Delta l\cos\left(2\theta + \frac{2}{3}\pi\right) & m - \Delta l\cos2\theta & l - \Delta l\cos\left(2\theta - \frac{2}{3}\pi\right) \end{bmatrix} \frac{d}{dt}\begin{bmatrix} I_u \\ I_v \\ I_w \end{bmatrix}$$

The following expressions (7) and (8) are derived by transforming the above expression (6) into expressions based on interphase currents and interphase voltages.

$$\begin{bmatrix} \frac{d}{dt}I_u \\ \frac{d}{dt}I_w \end{bmatrix} = K \begin{bmatrix} 2(l - m + 3\Delta l\cos2\theta) & -l + m + 3\Delta l\cos\left(2\theta + \frac{2}{3}\pi\right) \\ -l + m + 3\Delta l\cos\left(2\theta + \frac{2}{3}\pi\right) & 2(l - m) + 3\Delta l\cos\left(2\theta - \frac{2}{3}\pi\right) \end{bmatrix} \begin{bmatrix} V_u - V_v \\ V_w - V_v \end{bmatrix} \quad (7)$$

$$K = \frac{1}{\left\{2(l - m) + 3\Delta l\cos\left(2\theta - \frac{2}{3}\pi\right)\right\} \times \{2(l - m) + 3\Delta l\cos2\theta\} - \left\{l - m - 3\Delta l\cos\left(2\theta + \frac{2}{3}\pi\right)\right\}^2} \quad (8)$$

A description will now be given of a so-called dq transformation model for transforming the motor 1 into an equivalent circuit having a q-axis armature on the q-axis indicating the direction of magnetic flux of a magnetic field and a d-axis armature on the d-axis orthogonal to the q-axis. When the dq transformation model is used, the relationship between a d-axis voltage $V_d\hat{}$ and a q-axis voltage $V_q\hat{}$ and a d-axis current $I_d\hat{}$ and a q-axis current $I_q\hat{}$ obtained by transformation using an estimated value $\theta_d\hat{}$ of a rotor angle is represented by the following equation (9) if an electrical angular velocity is substantially zero and a voltage effect attributable to resistance of the d-axis armature and the q-axis armature is ignorable.

Based on the above description, the present invention will be explained below. A first mode of the method for detecting a rotor angle of a DC brushless motor in accordance with the present invention relates to a method for detecting a rotor angle of a DC brushless motor in a motor controller adapted to control the energization of the motor by determining a drive voltage to be applied to an armature of the motor at each predetermined control cycle so as to minimize the difference between a phase current passing through the armature of the DC brushless motor and a desired current.

The method includes a first step for superposing a periodic signal that causes the total sum of output voltages in a predetermined period, which includes two or more control cycles, to become zero over the drive voltage, a second step for calculating a first-order difference in a phase current of the motor between adjoining control cycles in the predetermined period, while maintaining the drive voltage during the predetermined period at a constant level, a third step for calculating a sine reference value and a cosine reference value on the basis of the double angle of a rotor angle of the motor, using the first-order difference calculated in the second step, and a fourth step for calculating the rotor angle of the motor on the basis of the sine reference value and the cosine reference value calculated in the third step.

With this arrangement, a periodic signal that causes the total sum of output voltages in a predetermined period to become zero is superposed over the drive voltage in the first step, and then a first-order difference in a phase current of the motor between adjoining control cycles in the predetermined period is calculated in the second step, while maintaining the drive voltage during the predetermined period at a constant level. Further, in the third step, a sine reference value and a cosine reference value on the basis of the double angle of the $$\frac{d}{dt}\begin{bmatrix} \hat{i}_d \\ \hat{i}_q \end{bmatrix} = \frac{1}{2}\begin{bmatrix} \left(\frac{1}{L_d} + \frac{1}{L_q}\right) + \left(\frac{1}{L_d} - \frac{1}{L_q}\right)\cos2\theta_e & \left(\frac{1}{L_d} - \frac{1}{L_q}\right)\sin2\theta_e \\ \left(\frac{1}{L_d} - \frac{1}{L_q}\right)\sin2\theta_e & \left(\frac{1}{L_d} - \frac{1}{L_q}\right) - \left(\frac{1}{L_d} - \frac{1}{L_q}\right)\cos2\theta_e \end{bmatrix}\begin{bmatrix} \hat{V}_d \\ \hat{V}_q \end{bmatrix} \quad (9)$$

$$\equiv \begin{bmatrix} L0 + L1\cos2\theta_e & L1\sin2\theta_e \\ L1\sin2\theta_e & L0 - L1\cos2\theta_e \end{bmatrix}\begin{bmatrix} \hat{V}_d \\ \hat{V}_q \end{bmatrix}$$

where $I_d\hat{}$: d-axis current; $I_q\hat{}$: q-axis current; $V_d\hat{}$: d-axis voltage; $V_q\hat{}$: q-axis voltage; $L_d$: Inductance of d-axis armature; $L_q$: Inductance of q-axis armature; and $\theta_e$: Phase difference between an estimated value $\theta\hat{}$ and an actual value $\theta$ of a rotor angle.

motor can be calculated, using the first-order difference. This makes it possible to accurately detect, in the fourth step, the rotor angle of the motor on the basis of the sine reference value and the cosine reference value, while restraining the influences of errors in detecting phase current.

Preferably, in the second step, the sine reference value and the cosine reference value are calculated according to the following expressions (10) to (14).

$$\begin{bmatrix} Vs \\ Vc \\ l-m \end{bmatrix} = K \begin{bmatrix} 3\Delta l \sin 2\theta \\ 3\Delta l \cos 2\theta \\ l-m \end{bmatrix} \qquad (10)$$

$$= (C^t C)^{-1} C^t \begin{bmatrix} dI(i+1) \\ dI(i+2) \\ \vdots \\ dI(i+n) \end{bmatrix}$$

where Vs: Sine reference value; Vc: Cosine reference value; l: DC component of self-inductance of each phase of the motor; m: DC component of mutual inductance among angle phases of the motor; dI(i+1) to dI(i+n)...: First-order difference in phase current between adjoining control cycles when n+1 control cycles are included in the predetermined period of the periodic signal; and i: Number of control cycle from which the predetermined period starts.

$$K = \frac{1}{\left\{2(l-m) + 3\Delta l \cos\left(2\theta - \frac{2}{3}\pi\right)\right\} \times \{2(l-m) + 3\Delta \cos 2\theta\} - \left\{l - m - 3\Delta \cos\left(2\theta + \frac{2}{3}\pi\right)\right\}} \qquad (11)$$

where θ: Rotor angle of the motor $$dI(i+j) = \begin{bmatrix} dI_u(i+j) \\ dI_w(i+j) \end{bmatrix} \qquad (12)$$

where j=1,2,...,n; $dI_u(i+j)$: First-order difference of phase current of U-phase; and $dI_w(i+j)$: First-order difference of phase current of W-phase $$C = \begin{bmatrix} c(i+1) \\ c(i+2) \\ \vdots \\ c(i+n) \end{bmatrix} \qquad (13)$$

$$c(i+j) = \qquad (14)$$

$$\begin{bmatrix} -\sin\frac{2}{3}\pi Vh_{wv}(i+j) & Vh_{uv}(i+j) + \cos\frac{2}{3}\pi Vh_{wv}(i+j) & 2Vh_{uv}(i+j) - Vh_{wv}(i+j) \\ -\sin\frac{2}{3}\pi(Vh_{uv}(i+j) - Vh_{wv}(i+j) & \cos\frac{2}{3}\pi(Vh_{uv}(i+j) + Vh_{wv}(i+j) & -Vh_{uv}(i+j) + 2Vh_{wv}(i+j) \end{bmatrix}$$

where $Vh_{uv}(i+j)$: Interphase voltage of U-phase and V-phase of j-th control cycle in the predetermined period of a periodic signal; and $Vh_{wv}(i+j)$: Interphase voltage of W-phase and V-phase of j-th control cycle in the predetermined period of a periodic signal.

The following expression (15) is derived when the above expression (7) is represented by means of a discrete-time system.

$$dI(i) \equiv \begin{bmatrix} \dfrac{I_u(i+1) - I_u(i)}{\Delta T} \\ \dfrac{I_w(i+1) - I_w(i)}{\Delta T} \end{bmatrix} \qquad (15)$$

$$= K \begin{bmatrix} 2(l-m) + 3\Delta l \cos 2\theta & -l+m + 3\Delta l \cos\left(2\theta + \frac{2}{3}\pi\right) \\ -l+m + 3\Delta l \cos\left(2\theta + \frac{2}{3}\pi\right) & 2(l-m) + 3\Delta l \cos\left(2\theta - \frac{2}{3}\pi\right) \end{bmatrix} \begin{bmatrix} V_u(i) - V_v(i) \\ V_w(i) - V_v(i) \end{bmatrix}$$

$$\equiv K \cdot M \begin{bmatrix} V_{uv}(i) \\ V_{wv}(i) \end{bmatrix}$$

$$= K \cdot M \left\{ \begin{bmatrix} Vfb_u(i) - Vfb_v(i) \\ Vfb_w(i) - Vfb_v(i) \end{bmatrix} + \begin{bmatrix} Vh_u(i) - Vh_v(i) \\ Vh_w(i) - Vh_v(i) \end{bmatrix} \right\}$$

$$\equiv K \cdot M \left\{ \begin{bmatrix} Vfb_{uv}(i) \\ Vfb_{wv}(i) \end{bmatrix} + \begin{bmatrix} Vh_{uv}(i) \\ Vh_{wv}(i) \end{bmatrix} \right\}$$

$$\equiv K \cdot M(Vfb(i) + Vh(i))$$

$$\equiv K \cdot M(Vfb(i) + Vh(i))$$

where $Vfb_u(i)$, $Vfb_v(i)$, $Vfb_w(i)$: The drive voltage at i-th control cycle; $Vh_u(i)$, $Vh_v(i)$, $Vh_w(i)$: Output voltage of the periodic signal at the i-th control cycle; and $\Delta T$: Time of control cycle.

The periodic signal takes n control cycles satisfying the following expression (16) as its one period.

$$\sum_{j=1}^{n} Vh(j) = 0, \quad \text{rank}[Vh(1) \ldots Vh(n)] = 2 \tag{16}$$

If it is assumed that Vfb is zero, then the above expression (15) is transformed into the following expression (17).

$$dI(i) = \begin{bmatrix} dI_u(i) \\ dI_{w(i)} \end{bmatrix} \tag{17}$$

$$= K \begin{bmatrix} 2(l-m)+3\Delta l\cos 2\theta & -l+m+3\Delta l\cos\left(2\theta+\frac{2}{3}\pi\right) \\ -l+m+3\Delta\cos\left(2\theta+\frac{2}{3}\pi\right) & 2(l-m)+3\Delta l\cos\left(2\theta-\frac{2}{3}\pi\right) \end{bmatrix} \begin{bmatrix} Vh_{uv}(i) \\ Vh_{wv}(i) \end{bmatrix}$$

$$= K \begin{bmatrix} 2(l-m)+3\Delta l\cos 2\theta & -l+m+3\Delta l\cos\frac{2}{3}\pi\cos 2\theta - 3\Delta l\sin\frac{2}{3}\pi\sin 2\theta \\ -l+m+3\Delta l\cos\frac{2}{3}\pi\cos 2\theta - 3\Delta l\sin\frac{2}{3}\pi\sin 2\theta & 2(l-m)+3\Delta l\cos\frac{2}{3}\pi\cos 2\theta + 3\Delta l\sin\frac{2}{3}\pi\sin 2\theta \end{bmatrix} \begin{bmatrix} Vh_{uv}(i) \\ Vh_{wv}(i) \end{bmatrix}$$

$$= K \begin{bmatrix} -\sin\frac{2}{3}\pi Vh_{wv}(i) & Vh_{uv}(i)+\cos\frac{2}{3}\pi Vh_{wv}(i) & 2Vh_{uv}(i)-Vh_{wv}(i) \\ -\sin\frac{2}{3}\pi(Vh_{uv}(i)-Vh_{wv}(i)) & \cos\frac{2}{3}\pi(Vh_{uv}(i)+Vh_{wv}(i)) & -Vh_{uv}(i)+2Vh_{wv}(i) \end{bmatrix} \begin{bmatrix} 3\Delta l\sin 2\theta \\ 3\Delta l\cos 2\theta \\ l-m \end{bmatrix}$$

$$\equiv K \cdot c(i) \begin{bmatrix} 3\Delta l\sin 2\theta \\ 3\Delta l\cos 2\theta \\ l-m \end{bmatrix}$$

If $c(i)$ is represented by the following expression (18), then the relationship represented by the following expressions (19) and (20) holds from the above expression (17).

$$\begin{bmatrix} c(i+1) \\ c(i+2) \\ \vdots \\ c(i+n) \end{bmatrix} \equiv C \tag{18}$$

$$\begin{bmatrix} dI(i+1) \\ dI(i+2) \\ \vdots \\ dI(i+n) \end{bmatrix} = \left( K \cdot M \begin{bmatrix} Vfb(i+1) \\ Vfb(i+2) \\ \vdots \\ Vfb((i+n)) \end{bmatrix} + K \cdot C \begin{bmatrix} 3\Delta l\sin 2\theta \\ 3\Delta l\cos 2\theta \\ l-m \end{bmatrix} \right) \tag{19}$$

$$(C^t C)^{-1} C^t \begin{bmatrix} dI(i+1) \\ dI(i+2) \\ \vdots \\ dI(i+n) \end{bmatrix} = (C^t C)^{-1} \left( K \cdot M \begin{bmatrix} Vfb(i+1) \\ Vfb(i+2) \\ \vdots \\ Vfb(i+n) \end{bmatrix} + K \cdot C \begin{bmatrix} 3\Delta l\sin 2\theta \\ 3\Delta l\cos 2\theta \\ l-m \end{bmatrix} \right) \tag{20}$$

$$= K \cdot (C^t C)^{-1} C^t M \begin{bmatrix} Vfb(i+1) \\ Vfb(i+2) \\ \vdots \\ Vfb(i+n) \end{bmatrix} + K \begin{bmatrix} 3\Delta l\sin 2\theta \\ 3\Delta l\cos 2\theta \\ i-m \end{bmatrix}$$

If the drive voltage in the predetermined period is assumed to take a constant value Vfb, then expression (21) shown below will be derived.

$$C^t M \begin{bmatrix} Vfb \\ Vfb \\ \vdots \\ Vfb \end{bmatrix} = \sum_{i=1}^{n} c(i) \cdot M \cdot Vfb \qquad (21)$$

$$= \sum_{i=1}^{n} \begin{bmatrix} -\sin\frac{2}{3}\pi V_{wv}(i) & V_{uv}(i) + \cos\frac{2}{3}\pi V_{wv}(i) & 2V_{uv}(i) - V_{wv}(i) \\ -\sin\frac{2}{3}\pi (V_{uv}(i) - V_{wv}(i)) & \cos\frac{2}{3}\pi (V_{uv}(i) + V_{wv}(i)) & -V_{uv}(i) + 2V_{wv}(i) \end{bmatrix} \cdot M \cdot Vfb = 0$$

Hence, the first term of the right side of the above expression (20) will be zero, and the following expression (22) will be derived.

$$(C^t C)^{-1} C^t \begin{bmatrix} dI(i+1) \\ dI(i+2) \\ \vdots \\ dI(i+n) \end{bmatrix} = K \begin{bmatrix} 3\Delta I \sin 2\theta \\ 3\Delta I \cos 2\theta \\ i - m \end{bmatrix} \qquad (22)$$

Thus, the sine reference value Vs and the cosine reference value Vc can be calculated according to the above expression (10), and the rotor angle θ can be calculated according to the following expression (23).

$$\theta = \frac{1}{2} \tan^{-1} \frac{Vs}{Vc} \qquad (23)$$

A first mode of a controller of a DC brushless motor in accordance with the present invention relates to an improvement of a controller of a DC brushless motor provided with a current detector for detecting a phase current passing through an armature of a DC brushless motor and an energization control unit for controlling the energization of the motor by determining, for each predetermined control cycle, a drive voltage to be applied to the armature of the motor such that the difference between a phase current detected by the current detector and a predetermined desired current is reduced.

The controller includes a periodic signal superposer for superposing a periodic signal that causes the total sum of output voltages in a predetermined period including two or more control cycles to become zero over the drive voltage, and a rotor angle detector for calculating, when the periodic signal has been superposed over the drive voltage, a first-order difference in a phase current of the motor between adjoining control cycles, while maintaining the drive voltage during the predetermined period at a constant level, and then calculating a sine reference value and a cosine reference value on the basis of a double angle of the motor by using the first-order difference so as to calculate the rotor angle of the motor on the basis of the sine reference value and the cosine reference value.

With this arrangement, when a periodic signal that causes the total sum of output voltages in a predetermined period to become zero has been superposed over the drive voltage by the periodic signal superposer, the rotor angle detector calculates a first-order difference in a phase current of the motor between adjoining control cycles during the predetermined period, while maintaining the drive voltage during the predetermined period at a constant level. Then, the sine reference value and the cosine reference value on the basis of a double angle of the rotor of the motor can be calculated by using the first-order difference. This makes it possible to accurately detect the rotor angle of the motor on the basis of the sine reference value and the cosine reference value, while restraining the influences of an error in detecting phase current.

The rotor angle detector is capable of calculating the sine reference value and the cosine reference value according to the above expressions (10) to (14) as in the case of the method for detecting a rotor angle of a DC brushless motor in accordance with the present invention.

A second mode of the method for detecting a rotor angle of a DC brushless motor relates to an improvement of a method for detecting a rotor angle of the motor, deemed as an equivalent circuit, which includes a q-axis armature on a q-axis indicating the direction of a magnetic flux of the magnetic field of the motor and a d-axis armature on a d-axis orthogonal to the q-axis, in a motor controller having a current detector for detecting phase currents passing through armatures of the motor, a dq current calculator for calculating a q-axis current passing through the q-axis armature and a d-axis current passing through the d-axis armature on the basis of the phase currents detected by the current detector and a rotor angle of the motor, and energization control unit for controlling the energization of the motor by determining a d-axis voltage to be applied to the d-axis armature and a q-axis voltage to be applied to the q-axis armature for each predetermined control cycle so as to minimize the difference between a q-axis command current, which is a command value of current passing through the q-axis armature, and a q-axis current and the difference between a d-axis command current, which is a command value of current passing through the d-axis armature, and a d-axis current.

The method includes a first step for superposing a periodic signal that causes the total sum of output voltages in a predetermined period including two or more control cycles to become zero over the d-axis drive voltage and the q-axis drive voltage, a second step for calculating a first-order difference of a d-axis current and a first-order difference of a q-axis current corresponding to a first-order difference in phase current of the motor between adjoining control cycles in the predetermined period, while maintaining the d-axis drive voltage and the q-axis drive voltage during the predetermined period at a constant level, by using an estimated value of a predetermined rotor angle, a third step for calculating a sine reference value and a cosine reference value on the basis of the double angle of the phase difference between an actual value of a rotor angle of the motor and an estimated value of the rotor angle, using the first-order difference of the d-axis current and the first-order difference of the q-axis current calculated in the second step, and a fourth step for calculating the rotor angle of the motor on the basis of the sine reference value and the cosine reference value calculated in the third step and the estimated value of the rotor angle in the first step.

With this arrangement, a periodic signal that causes the total sum of output voltages in the predetermined period to become zero is superposed in the first step, and a first-order difference of a d-axis current and a first-order difference of a q-axis current corresponding to a first-order difference in phase current of the motor between adjoining control cycles in the predetermined period are calculated in the second step, while maintaining the d-axis drive voltage and the q-axis drive voltage during the predetermined period at a constant level. In the third step, a sine reference value and a cosine reference value on the basis of the double angle of the phase difference between an actual value and an estimated value of a rotor angle of the motor can be calculated by using the first-order difference of the d-axis current and the first-order difference of the q-axis current. This makes it possible to accurately detect, in the fourth step, the rotor angle of the motor on the basis of the sine reference value and the cosine reference value and the estimated value of the rotor angle, while restraining influences of errors in detecting phase currents.

Preferably, in the third step, the sine reference value and the cosine reference value are calculated according to the following expressions (24) to (28).

$$\begin{bmatrix} Vs_{dq} \\ Vc_{dq} \\ L0 \end{bmatrix} = \begin{bmatrix} L1\sin 2\theta_e \\ L1\cos 2\theta_e \\ L0 \end{bmatrix} = (C_{dq}^t C_{dq})^{-1} C_{dq}^t \begin{bmatrix} dI_{dq}(i+1) \\ dI_{dq}(i+2) \\ \vdots \\ dI_{dq}(i+n) \end{bmatrix} \quad (24)$$

where $Vs_{dq}$: Sine reference value; $Vc_{dq}$: Cosine reference value; $dI_{dq}(i+1)$ to $dI_{dq}(i+n)$ ...: First-order difference of d-axis current and q-axis current between adjoining control cycles when n+1 control cycles are included in the predetermined period of the periodic signal; and i: Number of control cycle from which the predetermined period starts $$L0 = \frac{1}{L_d} + \frac{1}{L_q}, \quad L1 = \frac{1}{L_d} - \frac{1}{L_q} \quad (25)$$

where $L_d$: Inductance of the d-axis armature; and $L_q$: Inductance of the q-axis armature $$dI_{dq}(i+j) = \begin{bmatrix} dI_d(i+j) \\ dI_q(i+j) \end{bmatrix} \quad (26)$$

where j=1,2, ... ,n; $dI_d(i+j)$: First-order difference of current passing through the d-axis armature; and $dI_q(i+j)$: First-order difference of current passing through the q-axis armature $$C_{dq} = \begin{bmatrix} c_{dq}(i+1) \\ c_{dq}(i+2) \\ \vdots \\ c_{dq}(i+n) \end{bmatrix} \quad (27)$$

$$c_{dq}(i+j) = \begin{bmatrix} Vh_q(i+j) & Vh_d(i+j) & Vh_d(i+j) \\ Vh_d(i+j) & -Vh_q(i+j) & Vh_q(i+j) \end{bmatrix} \quad (28)$$

where $Vh_d(i+j)$: Output voltage to the d-axis armature in a j-th control cycle in the predetermined period of the periodic signal; and $Vh_q(i+j)$: Output voltage to the q-axis armature in the j-th control cycle in the predetermined period of the periodic signal.

Representing the above expression (9) by a discrete-time system leads to the following expression (29).

$$\begin{aligned} d\hat{I}_{dq}(i) &= \begin{bmatrix} d\hat{I}_d(i) \\ d\hat{I}_q(i) \end{bmatrix} \\ &= \begin{bmatrix} \frac{\hat{I}_d(i+1) - \hat{I}_d(i)}{\Delta T} \\ \frac{\hat{I}_q(i+1) - \hat{I}_q(i)}{\Delta T} \end{bmatrix} \\ &= \begin{bmatrix} L0 + L1\cos 2\theta_e & L1\sin 2\theta_e \\ L1\sin 2\theta_e & L0 - L1\cos 2\theta_e \end{bmatrix} \begin{bmatrix} \hat{V}_d(i) \\ \hat{V}_q(i) \end{bmatrix} \\ &\equiv M \begin{bmatrix} \hat{V}_d(i) \\ \hat{V}_q(i) \end{bmatrix} \\ &= M \begin{bmatrix} Vfb_d(i) + Vh_d(i) \\ Vfb_q(i) + Vh_q(i) \end{bmatrix} \\ &= M(Vfb_{dq}(i) + Vh_{dq}(i)) \end{aligned} \quad (29)$$

where $Vfb_d$: d-axis drive voltage at an i-th control cycle; $Vfb_q$: q-axis drive voltage at the i-th control cycle; $Vh_d(i)$: Voltage of the periodic signal superposed over the d-axis drive voltage at the i-th control cycle; $Vh_q(i)$: Voltage of the periodic signal superposed over the q-axis drive voltage at the i-th control cycle; and $\Delta T$: Time of control cycle.

The periodic signal takes n control cycles satisfying the following expression (30) as its one cycle.

$$\sum_{j=1}^{n} Vh_{dq}(j) = 0, \text{rank}[Vh_{dq}(1) \dots Vh_{dq}(n)] = 2 \quad (30)$$

If it is assumed that the d-axis drive voltage $Vfb_d(i)$ and the q-axis drive voltage $Vfb_q(i)$ are zero, then the above expression (29) is transformed into the following expression (31).

$$\begin{aligned} d\hat{I}_{dq}(i) &= \begin{bmatrix} d\hat{I}_d(i) \\ d\hat{I}_q(i) \end{bmatrix} \\ &= \begin{bmatrix} L0 + L1\cos 2\theta_e & L1\sin 2\theta_e \\ L1\sin 2\theta_e & L0 - L1\cos 2\theta_e \end{bmatrix} \begin{bmatrix} Vh_d(i) \\ Vh_q(i) \end{bmatrix} \\ &= \begin{bmatrix} Vh_q(i) & Vh_d(i) & Vh_d(i) \\ Vh_d(i) & -Vh_q(i) & Vh_q(i) \end{bmatrix} \begin{bmatrix} L1\sin 2\theta_e \\ L1\cos 2\theta_e \\ L0 \end{bmatrix} \\ &\equiv c_{dq}(i) \begin{bmatrix} L1\sin 2\theta_e \\ L1\cos 2\theta_e \\ L0 \end{bmatrix} \end{aligned} \quad (31)$$

If $C_{dq}(i)$ is represented by the following expression (32), then the relationship represented by the following expressions (33) and (34) holds from the above expression (31).

$$\begin{bmatrix} c_{dq}(i+1) \\ c_{dq}(i+2) \\ \vdots \\ c_{dq}(i+n) \end{bmatrix} \equiv C_{dq} \quad (32)$$

$$\begin{bmatrix} dI_{dq}(i+1) \\ dI_{dq}(i+2) \\ \vdots \\ dI_{dq}(i+n) \end{bmatrix} = \left( M_{dq} \begin{bmatrix} Vfb_{dq}(i+1) \\ Vfb_{dq}(i+2) \\ \vdots \\ Vfb_{dq}((i+n)) \end{bmatrix} + C_{dq} \begin{bmatrix} L1\sin 2\theta_e \\ L1\cos 2\theta_e \\ L0 \end{bmatrix} \right) \quad (33)$$

$$(C_{dq}^t C_{dq})^{-1} C_{dq}^t \begin{bmatrix} dI_{dq}(i+1) \\ dI_{dq}(i+2) \\ \vdots \\ dI_{dq}(i+n) \end{bmatrix} = (C_{dq}^t C_{dq})^{-1} C_{dq}^t \left( M_{dq} \begin{bmatrix} Vfb_{dq}(i+1) \\ Vfb_{dq}(i+2) \\ \vdots \\ Vfb_{dq}(i+n) \end{bmatrix} + C_{dq} \begin{bmatrix} L1\sin 2\theta_e \\ L1\cos 2\theta_e \\ L0 \end{bmatrix} \right) \quad (34)$$

$$= (C_{dq}^t C_{dq})^{-1} C_{dq}^t M_{dq} \begin{bmatrix} Vfb_{dq}(i+1) \\ Vfb_{dq}(i+2) \\ \vdots \\ Vfb(i+n) \end{bmatrix} + \begin{bmatrix} L1\sin 2\theta_e \\ L1\cos 2\theta_e \\ L0 \end{bmatrix}$$

If the d-axis drive voltage and the q-axis drive voltage in the predetermined period are assumed to take a constant value $Vfb_{dq}$, then expression (35) shown below will be derived.

$$C_{dq}^t M_{dq} \begin{bmatrix} Vfb_{dq} \\ Vfb_{dq} \\ \vdots \\ Vfb_{dq} \end{bmatrix} = \sum_{j=1}^{n} c_{dq}(i+j) \cdot M_{dq} \cdot Vfb \quad (35)$$

$$= \sum_{j=1}^{n} \begin{bmatrix} Vh_q(i+j) & Vh_d(i+j) & Vh_d(i+j) \\ Vh_d(i+j) & -Vh_q(i+j) & Vh_q(i+j) \end{bmatrix} \cdot$$

$$M_{dq} \cdot Vfb_{dq}$$

$$= 0$$

Therefore, the first term of the right side of the above expression (34) will be zero, and the following expression (36) will be obtained.

$$(C_{dq}^t C_{dq})^{-1} C_{dq}^t \begin{bmatrix} dI_{dq}(i+1) \\ dI_{dq}(i+2) \\ \vdots \\ dI_{dq}(i+n) \end{bmatrix} = \begin{bmatrix} L1\sin 2\theta_e \\ L1\cos 2\theta_e \\ L0 \end{bmatrix} \quad (36)$$

Thus, the sine reference value $Vs_{dq}$ and the cosine reference value $Vc_{dq}$ can be calculated according to the above expression (24), and the phase difference between an actual value and an estimated value of a rotor angle can be calculated according to the following expression (37).

$$\theta_e = \frac{1}{2} \tan^{-1} \frac{Vs_{dq}}{Vc_{dq}} \quad (37)$$

where θ: Phase difference between an estimated value and an actual value of a rotor angle.

Then, the rotor angle of the motor can be detected from the phase difference $\theta_e$ calculated according to the above expression (37) and the estimated value of the rotor angle mentioned above.

A second mode of the controller of a DC brushless motor, deemed as an equivalent circuit, which includes a q-axis armature on a q-axis indicating the direction of a magnetic flux of the magnetic field of the motor and a d-axis armature on a d-axis orthogonal to the q-axis, in accordance with the present invention relates to an improvement of a motor controller equipped with a current detector for detecting phase currents passing through armatures of the motor, a dq current converter for converting a phase current detected by the current detector into a q-axis current passing through the q-axis armature and a d-axis current passing through the d-axis armature, and an energization control unit for controlling the energization of the motor by determining a d-axis drive voltage to be applied to the d-axis armature and a q-axis drive voltage to be applied to the q-axis armature for each predetermined control cycle so as to minimize the difference between a q-axis command current, which is a command value of current passing through the q-axis armature, and a q-axis current and the difference between a d-axis command current, which is a command value of current passing through the d-axis armature, and a d-axis current.

The controller includes a periodic signal superposer for superposing a periodic signal that causes the total sum of output voltages in a predetermined period including two or more control cycles to become zero over the d-axis drive voltage and the q-axis drive voltage, and a rotor angle detector for calculating a first-order difference of a d-axis current and a first-order difference of a q-axis current corresponding to a first-order difference of a phase current of the motor between adjoining control cycles in the predetermined period, while maintaining the d-axis drive voltage and the q-axis drive voltage during the predetermined period at a constant level, by using an estimated value of a predetermined rotor angle, and for calculating a sine reference value and a cosine reference value on the basis of the double angle of the phase difference between an actual value and an estimated value of the rotor angle of the motor, using the first-order difference of the d-axis current and the first-order difference of the q-axis current so as to calculate the rotor angle of the motor on the basis of the sine reference value and the cosine reference value and the estimated value of the rotor angle.

With this arrangement, when a periodic signal that causes the total sum of output voltages in the predetermined period to become zero has been superposed over the d-axis drive voltage and the q-axis drive voltage by the periodic signal superposer, the rotor angle detector calculates a first-order difference of a d-axis current and a first-order difference of a q-axis current that correspond to a first-order difference in a phase current of the motor between adjoining control cycles during the predetermined period, while maintaining the d-axis drive voltage and the q-axis drive voltage during the predetermined period at a constant level. Then, the sine reference value and the cosine reference value on the basis of a double angle of the phase difference between an actual value of the rotor angle of the motor and an estimated value of the rotor angle can be calculated, using the first-order difference of the d-axis current and the first-order difference of the q-axis current. This makes it possible to accurately detect the rotor angle of the motor on the basis of the sine reference value and the cosine reference value and the estimated value of the rotor angle, while restraining the influences of an error in detecting phase currents.

The rotor angle detector is capable of calculating the sine reference value and the cosine reference value according to the above expressions (24) to (28) as in the case of the second mode of the method for detecting a rotor angle of a DC brushless motor in accordance with the present invention.

DESCRIPTION OF THE PREFERRED EMBODIMENTS

Figure 1:
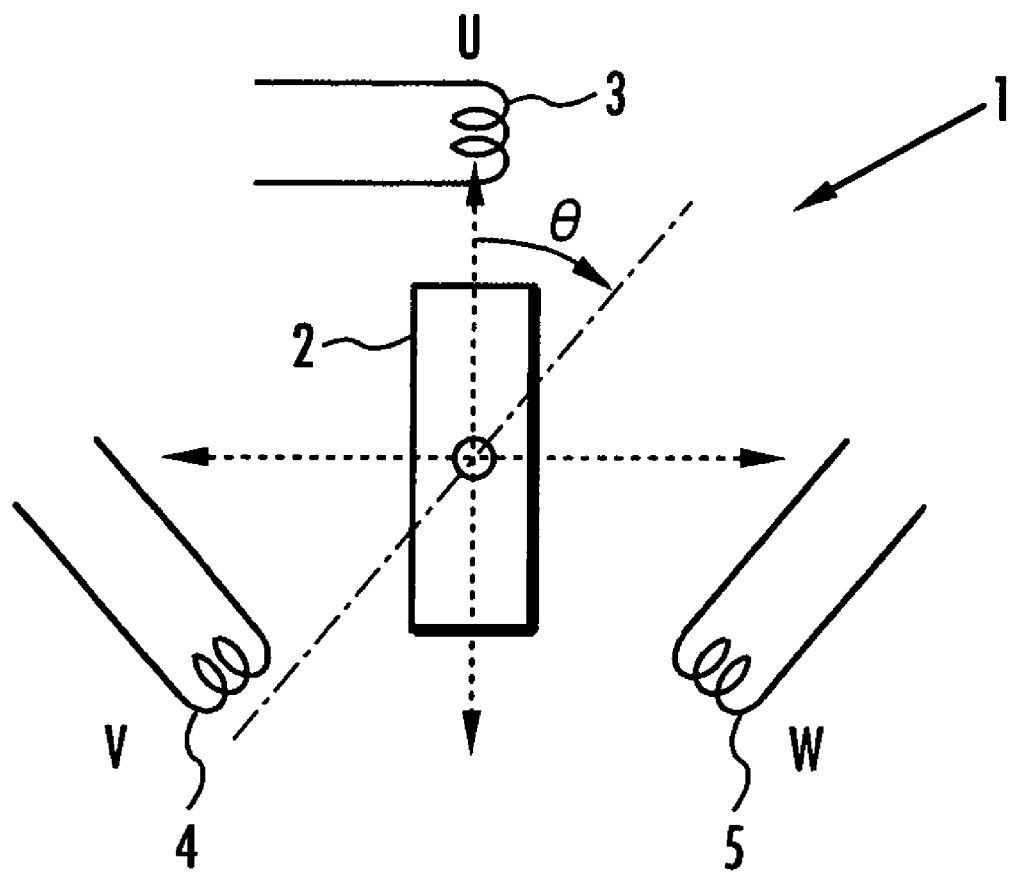
FIG. 1 is a diagram showing the construction of a DC brushless motor.
Figure 2:
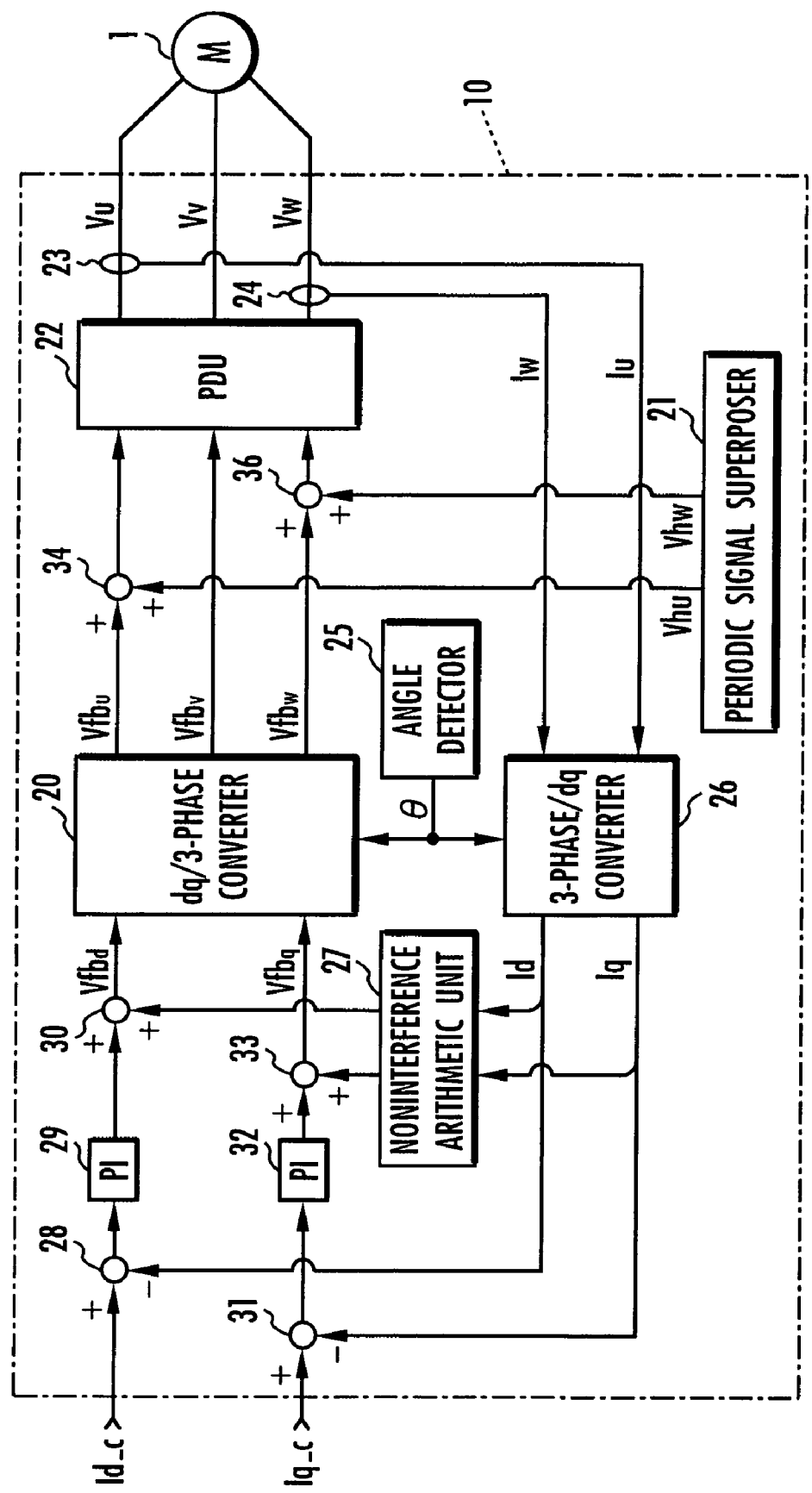
FIG. 2 is a block diagram showing a motor controller according to a first embodiment.
Figure 3:
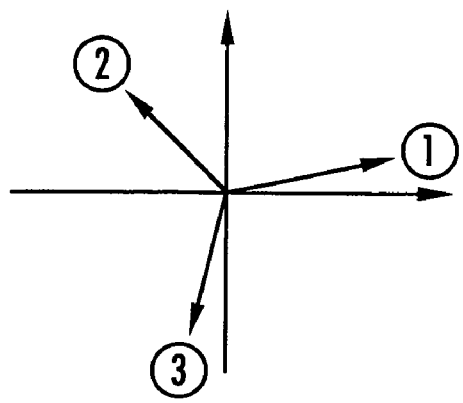
FIGS. 3A and 3B are explanatory diagrams showing how periodic signals are issued in the motor controller shown in FIG. 2.
Figure 3:
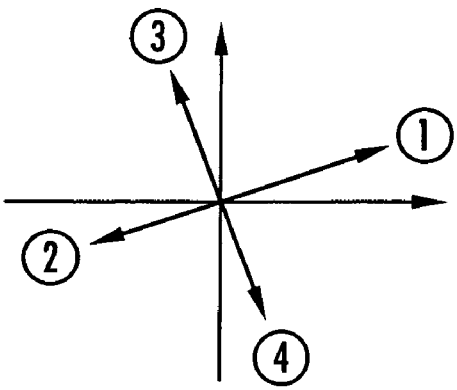
Figure 4:
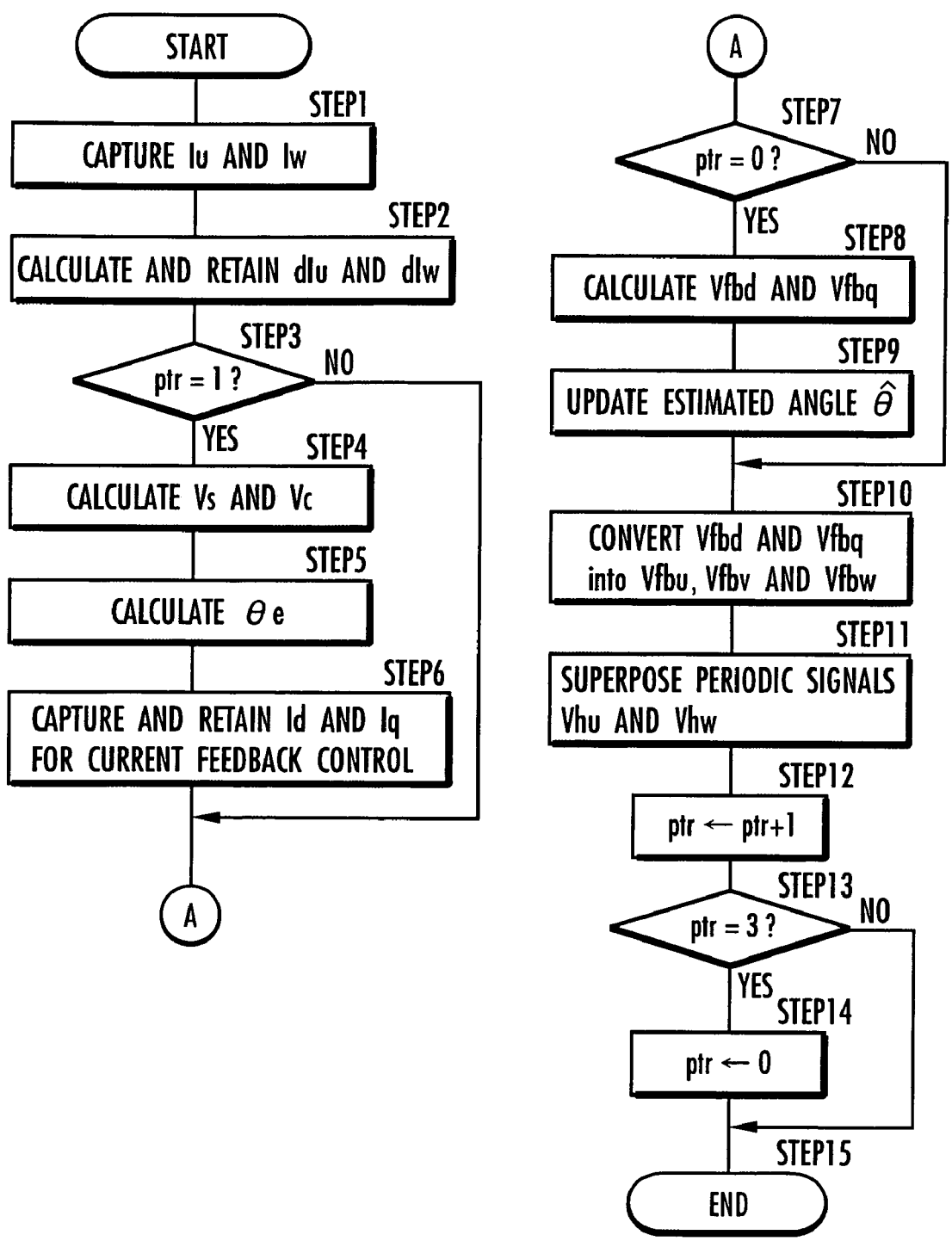
FIG. 4 is a flowchart of the processing for detecting a rotor angle in the motor controller shown in FIG. 2.
Figure 5:
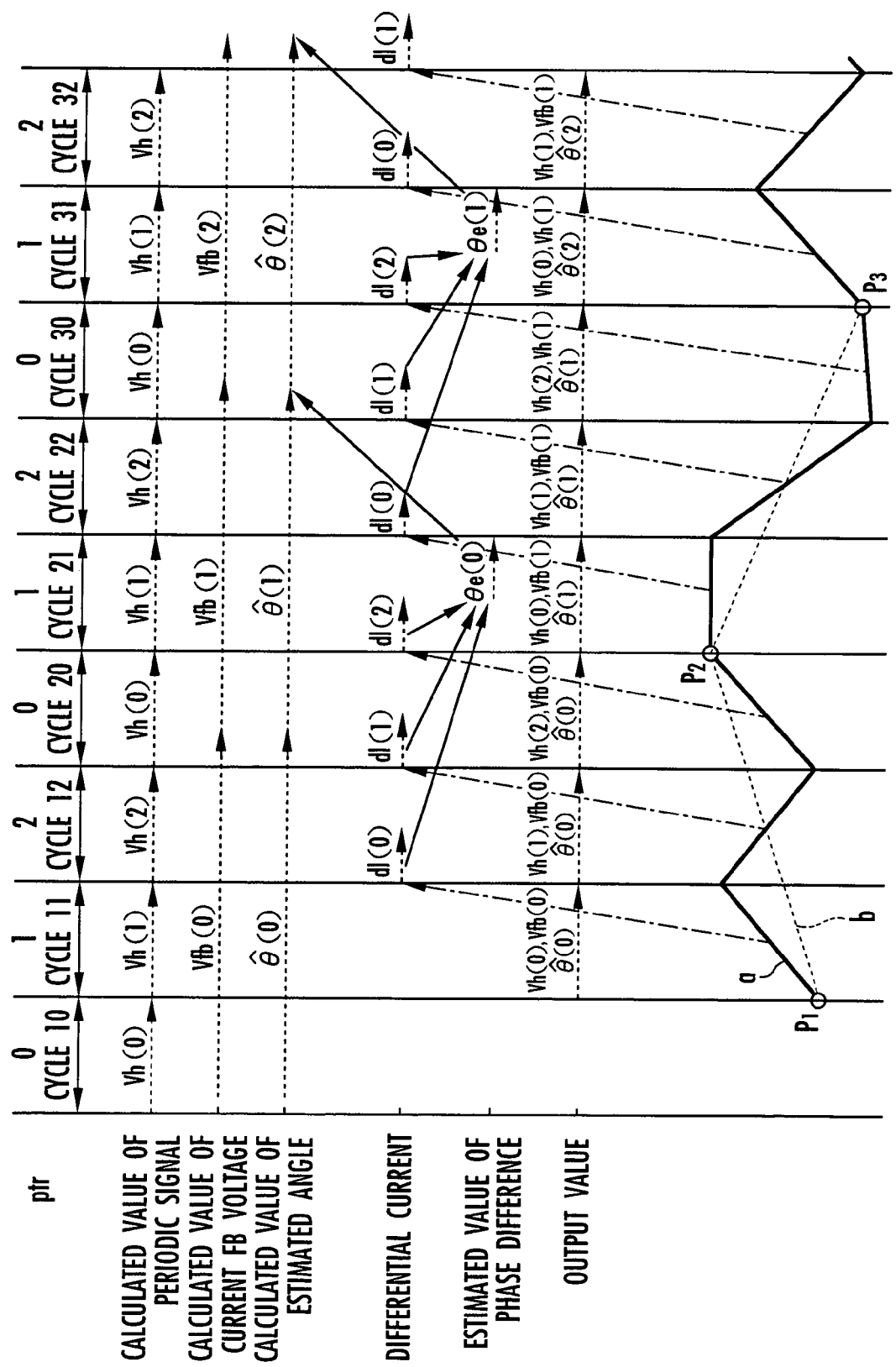
FIG. 5 is a timing chart associated with the flowchart of FIG. 4.
Figure 6:
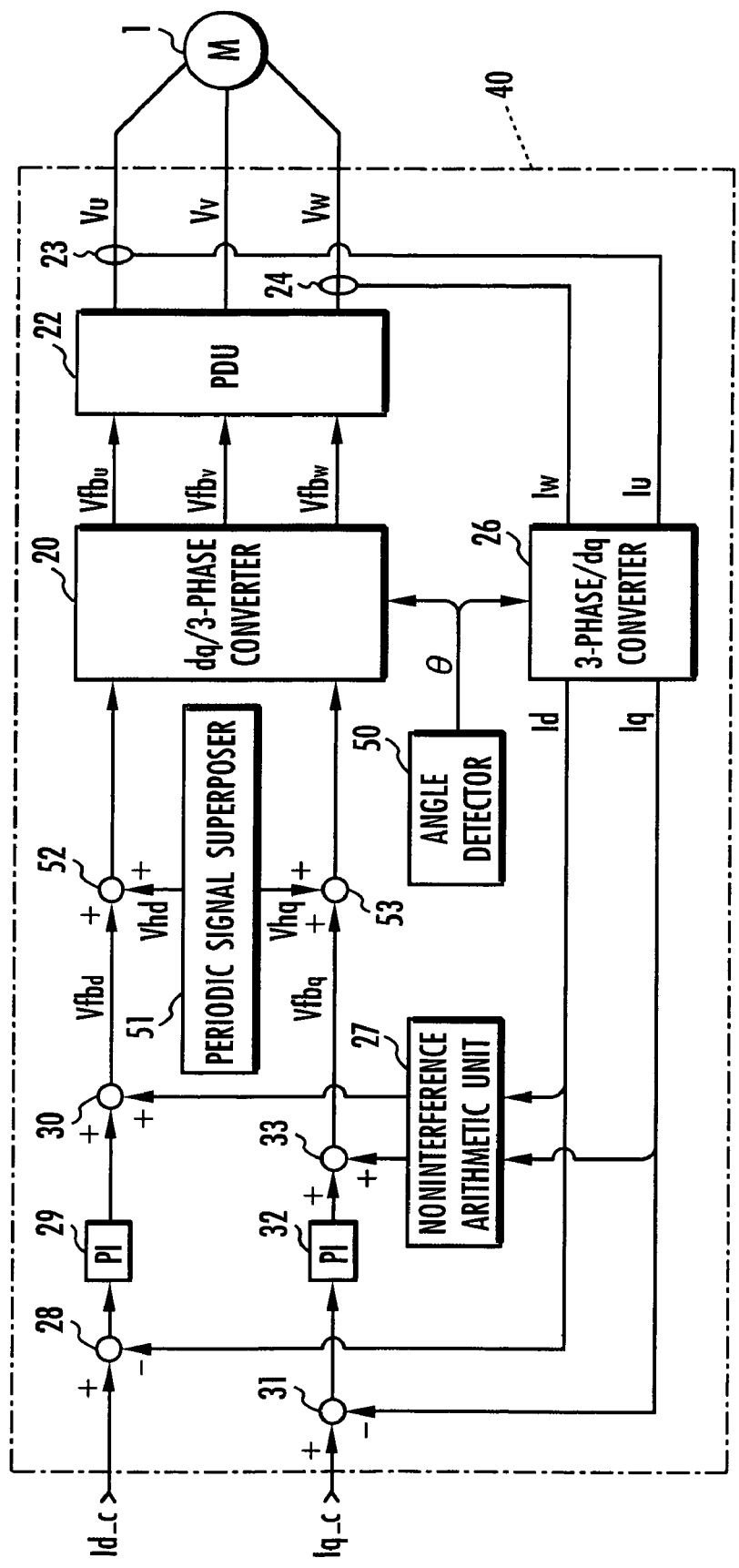
FIG. 6 is a block diagram of a motor controller according to a second embodiment.
Figure 7:
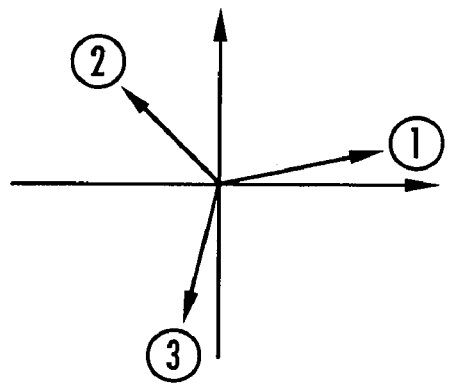
FIGS. 7A and 7B are explanatory diagrams showing how periodic signals are issued in the motor controller shown in FIG. 6.
Figure 7:
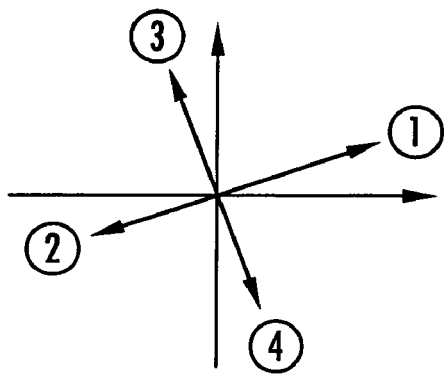
Figure 8:
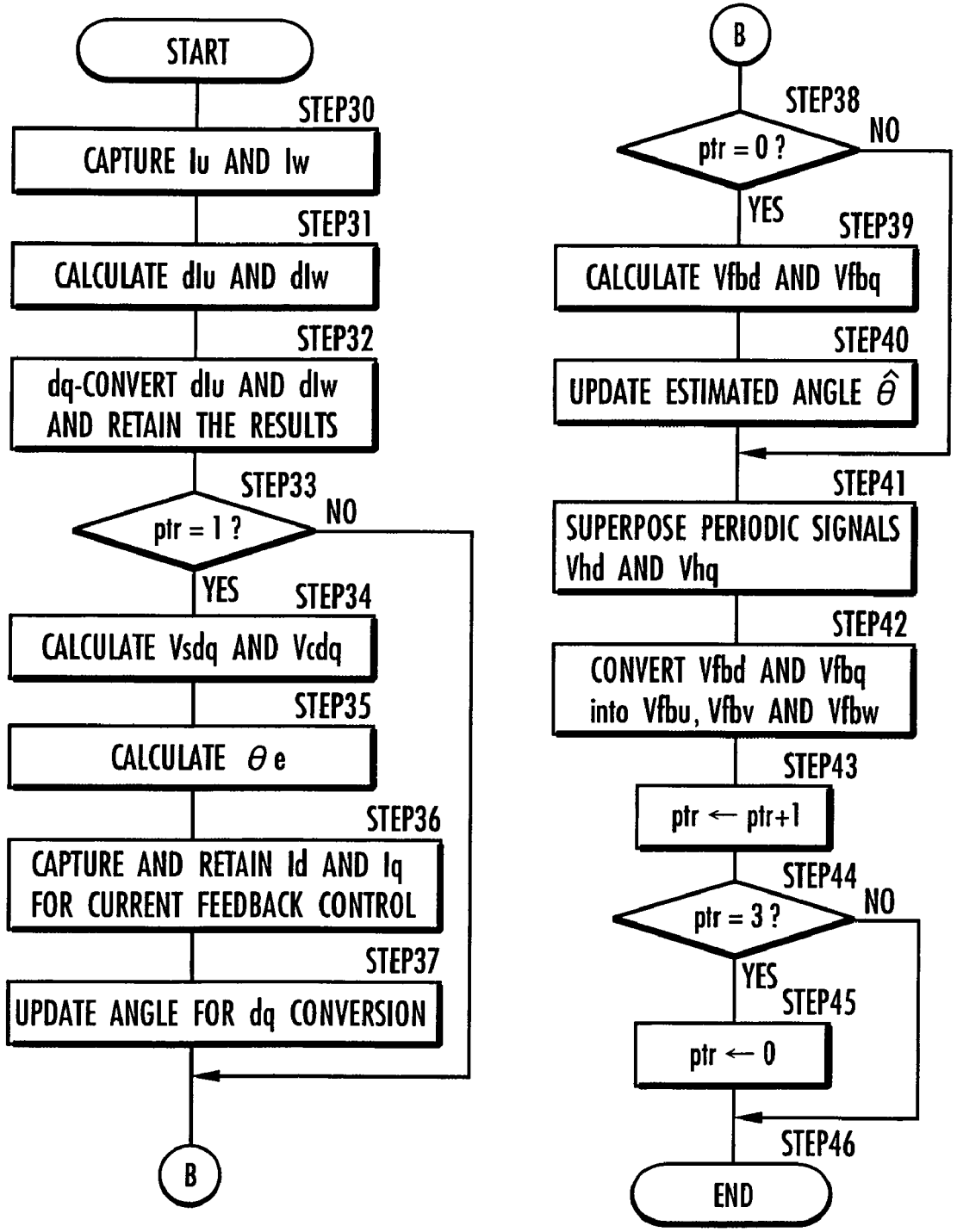
FIG. 8 is a flowchart of the processing for detecting a rotor angle in the motor controller shown in FIG. 6.
Figure 9:
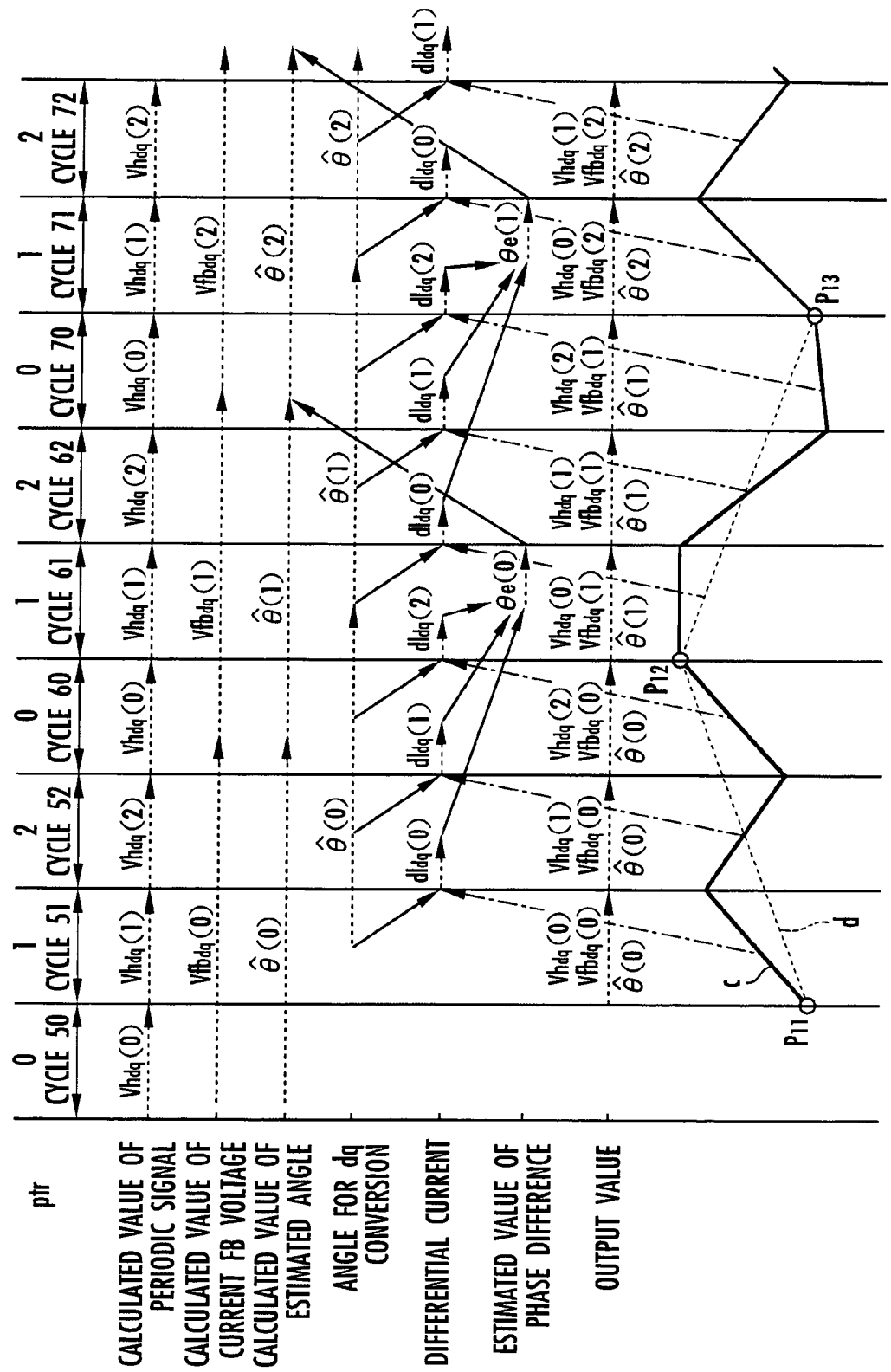
FIG. 9 is a timing chart associated with the flowchart of FIG. 8.

Embodiments of the present invention will be explained with reference to FIG. 1 through FIG. 9. FIG. 1 is a diagram showing the construction of a DC brushless motor, FIG. 2 is a block diagram showing a motor controller according to a first embodiment, FIGS. 3A and 3B are explanatory diagrams showing how periodic signals are issued in the motor controller shown in FIG. 2, FIG. 4 is a flowchart of the processing for detecting a rotor angle in the motor controller shown in FIG. 2, FIG. 5 is a timing chart associated with the flowchart of FIG. 4, FIG. 6 is a block diagram of a motor controller according to a second embodiment, FIGS. 7A and 7B are explanatory diagrams showing how periodic signals are issued in the motor controller shown in FIG. 6, FIG. 8 is a flowchart of the processing for detecting a rotor angle in the motor controller shown in FIG. 6, and FIG. 9 is a timing chart associated with the flowchart of FIG. 8.

First Embodiment

First, referring to FIG. 1 through FIG. 5, a first embodiment of the present invention will be explained. A control unit 10 of a DC brushless motor (hereinafter referred to simply as "the control unit 10") shown in FIG. 2 carries out feedback control of the current passing through armatures 3, 4 and 5 of the three phases (U, V, and W) of a DC brushless motor 1 (hereinafter referred to simply as "the motor 1") shown in FIG. 1. The control unit 10 handles the motor 1 by transforming it into an equivalent circuit based on a dq-coordinate system having a q-axis armature on a q-axis indicating the direction of a magnetic flux of a field pole of a rotor 2 and a d-axis armature on a d-axis orthogonal to the q-axis.

The control unit 10 conducts the feedback control on the current passing through the d-axis armature (hereinafter referred to as "the d-axis current") and the current passing through the q-axis armature (hereinafter referred to as "the q-axis current") in response to a d-axis command current Id_c and a q-axis command current Iq_c supplied from outside.

The control unit 10 includes a dq/3-phase converter 20 that converts a voltage $Vfb_d$ applied to the d-axis armature (hereinafter referred to as "the d-axis drive voltage") and a voltage $Vfb_q$ applied to the q-axis armature (hereinafter referred to as "the q-axis drive voltage") into drive voltages $Vfb_u$, $Vfb_v$, and $Vfb_w$ to be applied to the armatures of the three phases, namely, U, V and W of the motor 1. The control unit 10 further includes a periodic signal superposer 21 (corresponding to the periodic signal superposing means in the present invention) that superposes periodic signals $Vh_u$ and $Vh_w$ for detecting rotor angles over drive voltages $Vfb_u$ and $Vfb_w$, and a power drive unit 22 having an inverter circuit constructed of a plurality of switching devices that are bridge-connected such that voltages Vu, Vv and Vw based on the drive voltages $Vfb_u$, $Vfb_v$, and $Vfb_w$ (or $Vfb_u+Vh_u$, $Vfb_v+Vh_v$, and $Vfb_w+Vh_w$ if the periodic signals $Vh_u$ and $Vh_w$ have been superposed thereon) are applied to the armatures of the individual phases, U, V and W of the motor 1.

The control unit 10 further includes a U-phase current sensor 23 for detecting the current passing through the U-phase armature of the motor 1, a W-phase current sensor 24 for detecting the current passing through the W-phase armature of the motor 1, a 3-phase/dq converter 26 that calculates a d-axis actual current $I_d$, which is a detected value of a d-axis current, and a q-axis actual current $I_q$, which is a detected value of a q-axis current, on the basis of a detected current value $I_u$ of the U-phase current sensor 23 and a detected current value $I_w$ of the W-phase current sensor 24, an angle detector 25 (corresponding to the rotor angle detecting means in the present invention) that detects a rotor angle θ of the motor 1, and a noninterference arithmetic unit 27 that carries out processing to cancel the influences of velocity electromotive forces interfering between the d-axis and the q-axis.

The control unit 10 carries out subtraction on a d-axis command current Id_c and a d-axis actual current $I_d$ by a first subtractor 28, carries out PI (proportional integration) processing on the subtraction result by a first PI calculator 29, adds a noninterference component by a first adder 30, and generates a d-axis voltage $Vfb_d$ based on the difference between the d-axis command current Id_c and a d-axis actual current $I_d$ according to the following expression (38).

$$Vfb_d = K_p(Id\_c - I_d) + K_i \int (Id\_c - I_d)dt \tag{38}$$

where Kp: Proportional gain; and Ki: Integrational gain

Similarly, the control unit 10 carries out subtraction on a q-axis command current Iq_c and a q-axis actual current $I_q$ by a second subtractor 31, carries out PI processing on the subtraction result by a second PI calculator 32, adds a noninterference component by a second adder 33, and generates a q-axis voltage $Vfb_q$ based on the difference between the q-axis command current Iq_c and a q-axis actual current $I_q$ according to the following expression (39).

$$Vfb_q = K_p(Iq\_c - I_q) + K_i \int (Iq\_c - I_q)dt \tag{39}$$

where Kp: Proportional gain; and Ki: Integrational gain

Then, the control unit 10 supplies the d-axis drive voltage $Vfb_d$ and the q-axis drive voltage $Vfb_q$ to the dq/3-phase converter 20. The dq/3-phase converter 20 calculates drive voltages $Vfb_u$, $Vfb_v$ and $Vfb_w$ of the three phases according to the following expression (40) and outputs the obtained drive voltages to the power drive unit 22.

$$\begin{bmatrix} Vfb_u \\ Vfb_v \\ Vfb_w \end{bmatrix} = \begin{bmatrix} \sin\theta & \cos\theta \\ \sin\left(\theta - \frac{2}{3}\pi\right) & \cos\left(\theta - \frac{2}{3}\pi\right) \\ \sin\left(\theta - \frac{4}{3}\pi\right) & \cos\left(\theta - \frac{4}{3}\pi\right) \end{bmatrix} \begin{bmatrix} Vfb_d \\ Vfb_q \end{bmatrix} \tag{40}$$

Thus, the drive voltages $Vfb_u$, $Vfb_v$ and $Vfb_w$ of the three phases that minimize the difference between the d-axis command current Id_c and the d-axis actual current $I_d$ and the difference between the q-axis command current Iq_c and the q-axis actual current $I_q$ are applied to the armatures of the motor 1 through the intermediary of the power drive unit 22, thereby carrying out the feedback control on the current passing through the armatures of the motor 1.

The configuration for controlling the phase currents of the motor 1 by determining the drive voltages $Vfb_u$, $Vfb_v$ and $Vfb_w$ of the three phases such that the difference between the d-axis command current Id_c and the d-axis actual current $I_d$ and the difference between the q-axis command current Iq_c and the q-axis actual current $I_q$ are minimized corresponds to the energization controlling means in the present invention.

The rotor angle θ of the motor 1 is required to convert the d-axis drive voltage $Vfb_d$ and the q-axis drive voltage $Vfb_q$ into the drive voltages $Vfb_u$, $Vfb_v$ and $Vfb_w$ of the three phases by the dq/3-phase converter 20. The rotor angle θ of the motor 1 is also required to convert a detected current value Iu of the U-phase current sensor 23 and a detected current value Iw of the W-phase current sensor 24 into a d-axis actual current $I_d$ and a q-axis actual current $I_q$ by the 3-phase/dq converter 26.

Then, the control unit 10 carries out the processing for detecting the rotor angle θ by superposing periodic signals $Vh_u$, $Vh_v$ and $Vh_w$ over the drive voltages $Vfb_u$, $Vfb_v$ and $Vfb_w$ by the periodic signal superposer 21 in a third adder 34, and a fourth adder 36 without using a position detecting sensor, such as a resolver.

The output patterns of the periodic signals $Vh_u$, $Vh_v$ and $Vh_w$ in the present embodiment are set such that one period includes three control cycles ($T_{11}$, $T_{12}$ and $T_{13}$) and the total sum of the output voltages of the phases becomes zero for each period, as shown in FIG. 3A. As another output pattern, one period may consist of four control cycles ($T_{21}$, $T_{22}$, $T_{23}$ and $T_{24}$) and the setting may be made such that the total sum of output voltages becomes zero for each two control cycles ($T_{21}$ and $T_{22}$, and $T_{23}$ and $T_{24}$) in one period, as shown in, for example, FIG. 3B. The length of one period of the periodic signals $Vh_u$, $Vh_v$ and $Vh_w$ may be arbitrary as long as it is two control cycles or more.

The following will explain the processing for detecting the rotor angle θ of the motor 1 in the control unit 10 with reference to the flowchart shown in FIG. 4. The control unit 10 sets the initial value of a counter variable ptr to zero, and superposes the periodic signals $Vh_u$, $Vh_v$ and $Vh_w$ over the drive voltages $Vfb_u$, $Vfb_v$ and $Vfb_w$ by the periodic signal superposer 21. The control unit 10 repeatedly implements the processing indicated by the flowchart of FIG. 4.

An angle detector 25 captures the phase currents $I_u$ and $I_w$ detected by the U-phase current sensor 23 and the W-phase current sensor 24 in STEP 1, and calculates first-order differences $dI_u$ and $dI_w$ of the phase currents $I_u$ and $I_w$ in the previous control cycle and retains the calculation results in STEP 2. Then, if the counter variable ptr is 1 in the subsequent STEP 3, then the angle detector 25 proceeds to STEP 4 to carry out the processing from STEP 4 through STEP 6. If the counter variable ptr is not 1 in STEP 3, then the angle detector 25 branches to STEP 7.

The counter variable ptr is incremented for each control cycle in STEP 12, and if ptr reaches 3 (ptr=3) in STEP 13, then it is cleared (ptr=0) in STEP 14. Thus, every time three control cycles, which correspond to one period of the periodic signals $Vh_u$, $Vh_v$ and $Vh_w$, elapse, ptr becomes 1 (ptr=1) in STEP 3, and the processing from STEP 4 through STEP 6 is carried out.

The angle detector 25 calculates, in STEP 4, a sine reference value Vs and a cosine reference value Vc by using the first-order differences $dI_u$ and $dI_w$ calculated in STEP 2 in the current control cycle, the last control cycle, and the last but one control cycle. Specifically, the angle detector 25 calculates the sine reference value Vs and a cosine reference value Vc according to expression (41) shown below in which n has been substituted by 3, which is the number of control cycles included in one period of the periodic signals $Vh_u$, $Vh_v$ and $Vh_w$ in the above expression (10).

$$\begin{bmatrix} Vs \\ Vc \\ l - m \end{bmatrix} = K \begin{bmatrix} 3\Delta I \sin 2\theta \\ 3\Delta I \cos 2\theta \\ l - m \end{bmatrix} \tag{41}$$

$$= (C^t C)^{-1} C^t \begin{bmatrix} dI(i+1) \\ dI(i+2) \\ dI(i+3) \end{bmatrix}$$

where Vs: Sine reference value; Vc: Cosine reference value; l: DC component of self-inductance of each phase of the motor; m: DC component of mutual inductance among angle phases of the motor; dI(i+1) to dI(i+3): First-order difference of phase current calculated in a control cycle in which ptr=2,0,1.

The angle detector 25 further calculates an estimated value θ^ of the rotor angle by follow-up computation by an observer of the following expression (42).

$$\begin{bmatrix} \hat{\theta}(n+1) \\ \hat{\omega}(n+1) \end{bmatrix} = \begin{bmatrix} 1 & \Delta t \\ 0 & 1 \end{bmatrix} \begin{bmatrix} \hat{\theta}(n) \\ \hat{\omega}(n) \end{bmatrix} + \begin{bmatrix} K1 \\ K2 \end{bmatrix} K(\theta(n) - \hat{\theta}(n) + \text{offset}) \tag{42}$$

where $\hat{\theta}(n+1)$: Estimated value of a rotor angle in n+1(th) control cycle; $\hat{\omega}(n+1)$: Estimated value of an angular velocity in the n+1(th) control cycle; $\Delta t$: Time of control cycle; $\hat{\theta}(n)$: Estimated value of a rotor angle in n-th control cycle; $\hat{\omega}(n)$: Estimated value of an angular velocity in the n-th control cycle; K1, K2, K−: Computing gain; and offset: Offset value for current phase control.

The angle detector 25 uses expression (43) shown below to calculate, in STEP 5, the phase difference $\theta_e$ (=$\theta-\hat{\theta}$) between an actual value $\theta$ and an estimated value $\hat{\theta}$ of a rotor angle that will be necessary in the above expression (42).

$$\frac{Vs \cdot \cos 2\hat{\theta} - Vc \cdot \sin 2\hat{\theta}}{\sqrt{Vs^2 + Vc^2}} = K \frac{3\sqrt{3}}{4} \frac{\Delta l}{4} \sin(2\theta - 2\hat{\theta}) \quad (43)$$

$$\approx \tilde{K}(\theta - \hat{\theta})$$

$$= K \cdot \theta_e \, (\text{if } \theta - \hat{\theta} \approx 0)$$

The computation for normalizing $\sqrt{(Vs^2+Vc^2)}$ of the above expression (43) takes time, so that it may be approximated according to the following expression (44).

$$\frac{Vs \cdot \cos 2\hat{\theta} - Vc \cdot \sin 2\hat{\theta}}{\sqrt{Vs^2 + Vc^2}} \approx \begin{cases} \frac{Vs \cdot \cos 2\hat{\theta} - Vc \cdot \sin 2\hat{\theta}}{|Vs|} \\ \frac{Vs \cdot \cos 2\hat{\theta} - Vc \cdot \sin 2\hat{\theta}}{|Vc|} \end{cases} \quad (44)$$

In the subsequent STEP 6, $I_d$ and $I_q$ calculated by the 3-phase/dq converter 26 are retained for current feedback control. When the counter variable ptr becomes zero in STEP 7, the angle detector 25 proceeds to STEP 8 and calculates the d-axis drive voltage $Vfb_d$ and the q-axis drive voltage $Vfb_q$ according to the above expressions (38) and (39). In STEP 9, the estimated angle $\hat{\theta}$ is updated according to the above expression (42). If ptr=0 in STEP 7, then the angle detector 25 proceeds to STEP 10, skipping the processing of STEP 8 and STEP 9. Hence, the d-axis drive voltage $Vfb_d$ and the q-axis drive voltage $Vfb_q$ and the estimated angle $\hat{\theta}$ are updated for each period of the periodic signals $Vh_u$, $Vh_v$ and $Vh_w$. During one period of the periodic signals $Vh_u$, $Vh_v$ and $Vh_w$, the d-axis drive voltage $Vfb_d$ and the q-axis drive voltage $Vfb_q$ and the estimated angle $\hat{\theta}$ are retained at constant values.

In the subsequent STEP 10, the dq/3-phase converter 20 converts the d-axis drive voltage $Vfb_d$ and the q-axis drive voltage $Vfb_q$ into the three-phase drive voltages $Vfb_u$, $Vfb_v$ and $Vfb_w$. In STEP 11, the periodic signals $Vh_u$, $Vh_v$ and $Vh_w$ are superposed over the three-phase drive voltages $Vfb_u$, $Vfb_v$ and $Vfb_w$ by the periodic signal superposer 21, and the results are output to the power drive unit 22. Thus, the power drive unit 22 outputs the three-phase voltages Vu, Vv and Vw to the motor 1. The processing of the subsequent STEP 12 through STEP 15 increments or clears the counter variable ptr to finish the one control cycle.

The processing for superposing the periodic signals $Vh_u$, $Vh_v$ and $Vh_w$ by the periodic signal superposer 21 in STEP 11 corresponds to the first step in the present invention. The processing for calculating the first-order differences of phase currents by the angle detector 25 in STEP 2 corresponds to the second step in the present invention. The processing for calculating the sine reference value Vs and the cosine reference value Vc by the angle detector 25 in STEP 4 corresponds to the third step in the present invention. The processing for updating an estimated angle by the angle detector 25 in STEP 9 corresponds to the fourth step in the present invention.

FIG. 5 is a timing chart applied when the processing indicated by the flowchart of FIG. 4 is repeatedly carried out to detect the rotor angle $\theta$. The processing is begun at cycle 10. Three control cycles corresponding to ptr=0 to 2 (cycles 11, 12, 20, cycles 21, 22, 30, . . . ) constitute one cycle of the periodic signal Vh ($Vh_u$, $Vh_v$ and $Vh_w$), and the periodic signal switches as follows: Vh(1)(when ptr=1)→Vh(2)(when ptr=2)→Vh(0)(when ptr=0).

Then, the three-phase drive voltages Vfb ($Vfb_u$, $Vfb_v$, $Vfb_w$) are changed at the control cycle of ptr=0 as the d-axis drive voltage $Vfb_d$ and the q-axis drive voltage $Vfb_q$ are calculated. Therefore, the three-phase drive voltages Vfb are retained at constant levels (Vfb(0) during cycles 11, 12 and 20, or Vfb(1) during cycles 21, 22 and 30) while a periodic signal is switching as follows: Vh(1)→Vh(2)→Vh(0).

At control cycle 21 and control cycle 32 in which ptr=1, the phase difference $\theta_e$ between the actual value and the estimated value of a rotor angle is calculated (the processing of STEP 5 shown in FIG. 4). At control cycle 21 and control cycle 31 in which ptr=0, the drive voltage Vfb and the estimated value $\hat{\theta}$ of the rotor angle are updated (the processing of STEP 8 and STEP 9 shown in FIG. 4). Thus, the drive voltage Vfb and the estimated value $\hat{\theta}$ of the rotor angle are updated at the same timing thereby to avoid a disagreement in the rotor angle when the drive voltage Vfb is output.

In the chart, "a" denotes a change in phase current, and "b" denotes a feedback control response of the phase current. The influences on the feedback control of phase current attributable to the superposition of periodic signals Vh are cancelled by the drive voltages Vh calculated at the timings of $P_1$, $P_2$ and $P_3$ in the chart.

In the present first embodiment, the sine reference value Vs and the cosine reference value Vc have been calculated according to the above expression (41); however, the expression used for calculating the sine reference value Vs and the cosine reference value Vc is determined according mainly to the modes of the periodic signals Vh.

Second Embodiment

Referring now to FIG. 6 through FIG. 9, a second embodiment of the present invention will be explained. A control unit 40 of a DC brushless motor (hereinafter referred to simply as "the control unit 40") shown in FIG. 6 conducts feedback control of phase current of the motor 1, as with the control unit 10 shown in FIG. 2. Like components as those of the control unit 10 will be assigned like reference numerals and the description thereof will be omitted.

Differing from the control unit 10 in the method for detecting a rotor angle, the control unit 40 has a periodic signal superposer 51 (corresponding to the periodic signal superposing means in the present invention) for superposing periodic signals $Vh_d$ and $Vh_q$ over a d-axis drive voltage $Vfb_d$ and a q-axis drive voltage $Vfb_q$. An angle detector 50 (corresponding to the rotor angle detecting means in the present invention) detects a rotor angle $\delta$ on the basis of phase currents $I_u$ and $I_w$ detected by a U-phase current sensor 23 and a W-phase current sensor 24 when the periodic signals $Vh_d$ and $Vh_q$ have been superposed by the periodic signal superposer 51.

The output patterns of the periodic signals $Vh_d$ and $Vh_q$ in the present embodiment are set such that one period includes three control cycles ($T_{11}$, $T_{12}$ and $T_{13}$) and the total sum of the output voltages of the phases becomes zero for each period, as shown in FIG. 7A. As another output pattern, one period may consist of four control cycles ($T_{21}$, $T_{22}$, $T_{23}$ and $T_{24}$) and the setting may be made such that the total sum of output voltages becomes zero for each two control cycles ($T_{21}$ and $T_{22}$, and $T_{23}$ and $T_{24}$) in one period, as shown in, for example, FIG. 7B. The length of one period of the periodic signals $Vh_d$ and $Vh_q$ may be arbitrary as long as it is two control cycles or more.

The following will explain the processing for detecting the rotor angle of the motor 1 in the control unit 40 with reference to the flowchart shown in FIG. 8. The control unit 40 sets a counter variable ptr to zero, and superposes the periodic signals $Vh_d$ and $Vh_q$ over the d-axis drive voltage $Vfb_d$ and the q-axis drive voltage $Vfb_q$ by the periodic signal superposer 51. The control unit 40 repeatedly implements the processing indicated by the flowchart of FIG. 8.

The angle detector 50 captures phase currents $I_u$ and $I_w$ detected by the U-phase current sensor 23 and the W-phase current sensor 24 in STEP 30, and calculates first-order differences $dI_u$ and $dI_w$ of the phase currents $I_u$ and $I_w$ in the previous control cycle in STEP 31. Then, in the next STEP 32, the angle detector 50 calculates and retains $dI_d$ and $dI_q$ obtained by subjecting the first-order differences $dI_u$ and $dI_w$ to three-phase/dq conversion.

If the counter variable ptr is 1 in the subsequent STEP 33, then the angle detector 50 proceeds to STEP 34 to carry out the processing from STEP 34 through STEP 37. If the counter variable ptr is not 1 in STEP 33, then the angle detector 50 branches to STEP 38.

The counter variable ptr is incremented for each control cycle in STEP 43, and if ptr reaches 3 (ptr=3) in STEP 44, then it is cleared (ptr=0) in STEP 45. Thus, each time three control cycles, which correspond to one period of the periodic signals $Vh_d$ and $Vh_q$, elapse, ptr becomes 1 (ptr=1) in STEP 33, and the processing from STEP 34 through STEP 37 is carried out.

The angle detector 50 calculates, in STEP 34, a sine reference value $VS_{dq}$ and a cosine reference value $Vc_{dq}$ by using the first-order differences $dI_d$ and $dI_q$ calculated in STEP 32 in the current control cycle, the last control cycle, and the last but one control cycle. Specifically, the angle detector 50 calculates the sine reference value $Vs_{dq}$ and a cosine reference value $Vc_{dq}$ according to expression (45) shown below in which n has been substituted by 3, which is the number of control cycles included in one period of the periodic signals Vhd and Vhq in the above expression (24).

$$\begin{bmatrix} Vs_{dq} \\ Vc_{dq} \\ L0 \end{bmatrix} = \begin{bmatrix} L1\sin2\theta_e \\ L1\cos2\theta_e \\ L0 \end{bmatrix} \qquad (45)$$

$$= (C_{dq}^t C_{dq})^{-1} C_{dq}^t \begin{bmatrix} dI_{dq}(i+1) \\ dI_{dq}(i+2) \\ dI_{dq}(i+3) \end{bmatrix}$$

where $Vs_{dq}$: Sine reference value; $Vc_{dq}$: Cosine reference value; $dI_{dq}(i+1)$ to $dI_{dq}(i+3)$: First-order difference of d-axis current and q-axis current calculated in a control cycle in which ptr=2,0,1.

The angle detector 50 further calculates an estimated value $\hat{\theta}$ of the rotor angle by follow-up computation by an observer of the following expression (46) or (47).

$$\begin{bmatrix} \hat{\theta}(n+1) \\ \hat{\omega}(n+1) \end{bmatrix} = \begin{bmatrix} 1 & \Delta t \\ 0 & 1 \end{bmatrix} \begin{bmatrix} \hat{\theta}(n) \\ \hat{\omega}(n) \end{bmatrix} + \begin{bmatrix} K1 \\ K2 \end{bmatrix} \tilde{K} \frac{1}{2} \tan^{-1} \frac{\hat{V}s_{dq}}{\hat{V}c_{dq}} \qquad (46)$$

$$= \begin{bmatrix} 1 & \Delta t \\ 0 & 1 \end{bmatrix} \begin{bmatrix} \hat{\theta}(n) \\ \hat{\omega}(n) \end{bmatrix} + \begin{bmatrix} K1 \\ K2 \end{bmatrix} \tilde{K}(\theta_e(n) + \text{offset})$$

where $\hat{\theta}(n+1)$: Estimated value of a rotor angle in n+1(th) control cycle; $\hat{\omega}(n+1)$: Estimated value of an angular velocity in the n+1(th) control cycle; $\Delta t$: Time of one control cycle; $\hat{\theta}(n)$: Estimated value of a rotor angle in n-th control cycle; $\hat{\omega}(n)$: Estimated value of an angular velocity in the n-th control cycle; K1, K2, K⁻: Computing gain; and offset: Offset value for current phase control.

$$\begin{bmatrix} \hat{\theta}(n+1) \\ \hat{\omega}(n+1) \end{bmatrix} = \begin{bmatrix} 1 & \Delta t \\ 0 & 1 \end{bmatrix} \begin{bmatrix} \hat{\theta}(n) \\ \hat{\omega}(n) \end{bmatrix} + \begin{bmatrix} K1 \\ K2 \end{bmatrix} \tilde{K} \frac{\hat{V}s_{dq}}{\sqrt{\hat{V}s_{dq}^2 + \hat{V}c_{dq}^2}} \qquad (47)$$

$$\approx \begin{bmatrix} 1 & \Delta t \\ 0 & 1 \end{bmatrix} \begin{bmatrix} \hat{\theta}(n) \\ \hat{\omega}(n) \end{bmatrix} + \begin{bmatrix} K1 \\ K2 \end{bmatrix} \tilde{K}(\theta_e(n) + \text{offset})(\theta_e(n) \approx 0)$$

The angle detector 50 uses expression (48) or (49) shown below to calculate, in STEP 35, the phase difference $\theta_e$ (=$\theta$−$\hat{\theta}$) between an actual value $\theta$ and an estimated value $\hat{\theta}$ of a rotor angle that will be necessary in the above expression (46) or (47).

$$\theta_e = \frac{1}{2}\tan^{-1}\frac{\hat{V}s_{dq}}{\hat{V}c_{dq}} \qquad (48)$$

$$\theta_e \approx \frac{\hat{V}s_{dq}}{\sqrt{\hat{V}s_{dq}^2 + \hat{V}c_{dq}^2}}(\theta_e(n) \approx 0) \qquad (49)$$

The computation for normalizing $\sqrt{(Vs_{dq}^2 + Vc_{dq}^2)}$ of the above expression (49) takes time, so that it may be approximated according to the following expression (50).

$$\frac{\hat{V}s_{dq}}{\sqrt{\hat{V}s_{dq}^2 + \hat{V}c_{dq}^2}} \approx \begin{cases} \frac{\hat{V}s}{|\hat{V}s|}(\text{if}|\hat{V}s| > |\hat{V}c|) \\ \frac{\hat{V}s}{|\hat{V}c|}(\text{if}|\hat{V}c| > |\hat{V}s|) \end{cases} \qquad (50)$$

In the subsequent STEP 36, $I_d$ and $I_q$ calculated by a 3-phase/dq converter 26 are retained for current feedback control. Then, in STEP 37, the rotor angle $\hat{\theta}$ used in the 3-phase/dq converter 26 is updated.

When the counter variable ptr becomes zero in the next STEP 38, the angle detector 50 proceeds to STEP 39 and calculates the d-axis drive voltage $Vfb_d$ and the q-axis drive voltage $Vfb_q$ according to the above expressions (38) and (39). In STEP 40, the angle detector 50 updates the estimated angle $\hat{\theta}$ according to the above expression (47). If ptr is not zero in STEP 38, then the angle detector 50 proceeds to STEP 41, skipping the processing of STEP 39 and STEP 40.

Hence, the d-axis drive voltage $Vfb_d$ and the q-axis drive voltage $Vfb_q$ and the estimated angle $\hat{\theta}$ are updated for each period (every three control cycles) of the periodic signals $Vh_d$ and $Vh_q$. During one period of the periodic signals $Vh_d$ and $Vh_q$, the d-axis drive voltage $Vfb_d$ and the q-axis drive voltage $Vfb_q$ and the estimated angle $\hat{\theta}$ are retained at constant values. As described above, the rotor angle used in the 3-phase/dq converter 26 is updated in STEP 37 when ptr is 1 (ptr=1). Therefore, the estimated angle θ updated in STEP 40 will be used by the 3-phase/dq converter 26 from the next control cycle.

The updating of the rotor angle for dq conversion is delayed as described above in order to ensure agreement between the rotor angle at the point when the d-axis drive voltage $Vfb_d$ and the q-axis drive voltage $Vfb_q$ are calculated in STEP 39 and the rotor angle at the point when the first-order difference $dI_d$ of d-axis current and the first-order difference $dI_q$ of q-axis current are calculated in STEP 32. Matching the rotor angles in STEP 39 and STEP 32 restrains an error due to a change in the rotor angle when calculating the differential currents $dI_d$ and $dI_q$.

In the subsequent STEP 41, the periodic signal superposer 51 superposes the periodic signal $Vh_d$ and $Vh_q$ over the d-axis drive voltage $Vfb_d$ and the q-axis drive voltage $Vfb_q$, and in STEP 42, a dq/3-phase converter 20 converts the d-axis drive voltage $Vfb_d$ and the q-axis drive voltage $Vfb_q$ into the three-phase drive voltages $Vfb_u$, $Vfb_v$ and $Vfb_w$, which are supplied to the power drive unit 22. Then, the processing of the subsequent STEP 44 through STEP 46 increments or clears the counter variable ptr to finish the one control cycle.

FIG. 9 is a timing chart applied when the processing indicated by the flowchart of FIG. 8 is repeatedly carried out to detect the rotor angle θ. The processing is begun at cycle 50. Three control cycles corresponding to ptr=1, 2, 0 (cycles 51, 52, 60, cycles 61, 62, 70, . . . ) constitute one cycle of the periodic signal $Vh_{dq}$ ($Vh_d$ and $Vh_q$), and the periodic signal switches as follows: $Vh_{dq}(0)$(when ptr=1)→$Vh_{dq}(1)$(when ptr=2)→$Vh_{dq}(2)$(when ptr=0).

Then, at the control cycle in which ptr=0, the d-axis drive voltage $Vfb_d$ and the q-axis drive voltage $Vfb_q$ (hereinafter combined and referred to as "the dq drive voltages $Vfb_{dq}$") are calculated (the processing of STEP 39 shown in FIG. 8). Therefore, the dq drive voltages $Vfb_{dq}$ are retained at constant levels ($Vfb_{dq}(0)$ during cycles 51, 52 and 53, or $Vfb_{dq}(1)$ during cycles 61, 62 and 63) while a periodic signal $Vh_{dq}$ is switching as follows: $Vh_{dq}(0)$→$Vh_{dq}(1)$→$Vh_{dq}(2)$.

At control cycle 61 and control cycle 71 in which ptr=1, the phase difference $\theta_e$ between the actual value and the estimated value of a rotor angle is calculated (the processing of STEP 35 shown in FIG. 8), and the rotor angle for the dq current conversion is updated (the processing of STEP 37 shown in FIG. 8). At control cycle 61 and control cycle 71 in which ptr=0, the dq drive voltage $Vfb_{dq}$ and the estimated value $\hat{\theta}$ of the rotor angle are updated (the processing of STEP 39 and STEP 40 shown in FIG. 8). Thus, the dq drive voltage $Vfb_{dq}$ and the estimated value $\hat{\theta}$ of the rotor angle are updated at the same timing thereby to avoid disagreement in the rotor angle when the dq drive voltage $Vfb_{dq}$ is output.

In the chart of FIG. 9, "c" denotes a change in dq current, and "d" denotes a feedback control response of the dq current. The influences on the feedback control of dq current attributable to the superposition of periodic signals $Vh_{dq}$ are cancelled by the dq drive voltages $Vfb_{dq}$ calculated at the timings of $P_{12}$ and $P_{13}$ in the chart.

In the present second embodiment, the sine reference value $Vs_{dq}$ and the cosine reference value $Vc_{dq}$ have been calculated according to the above expression (45); however, the expression used for calculating the sine reference value $Vs_{dq}$ and the cosine reference value $Vc_{dq}$ is determined mainly according to the modes of the periodic signals $Vh_{dq}$.

What is claimed is:

1. A method for detecting a rotor angle of a DC brushless motor in a motor controller that controls the energization of the motor by deciding a drive voltage to be applied to an armature of the motor for each predetermined control cycle so as to minimize the difference between a phase current passing through the armature of the DC brushless motor and a desired current, comprising:
   a first step for superposing a periodic signal that causes the total sum of output voltages in a predetermined period including two or more control cycles to become zero over the drive voltage;
   a second step for calculating a first-order difference in phase current of the motor between adjoining control cycles in the predetermined period, while maintaining the drive voltage during the predetermined period at a constant level;
   a third step for calculating a sine reference value and a cosine reference value on the basis of the double angle of a rotor angle of the motor, using the first-order difference calculated in the second step; and
   a fourth step for calculating the rotor angle of the motor on the basis of the sine reference value and the cosine reference value calculated in the third step.

2. The method for detecting a rotor angle of a DC brushless motor according to claim 1, wherein the sine reference value and the cosine reference value are calculated in the second step according to expressions (51) to (55) given below:

$$\begin{bmatrix} Vs \\ Vc \\ l-m \end{bmatrix} = K \begin{bmatrix} 3\Delta l \sin 2\theta \\ 3\Delta l \cos 2\theta \\ l-m \end{bmatrix} \quad (51)$$

$$= (C^t C)^{-1} C^t \begin{bmatrix} dI(i+1) \\ dI(i+2) \\ \vdots \\ dI(i+n) \end{bmatrix}$$

where Vs: Sine reference value; Vc: Cosine reference value; l: DC component of self inductance of each phase of a motor; m: DC component of mutual inductance between angle phases of the motor; dI(i+1) to dI(i+n) . . . : First-order difference in phase current between adjoining control cycles when n+1 control cycles are included in the predetermined period of the periodic signal; and i: Number of control cycle from which the predetermined period starts $$K = \frac{1}{\left\{2(l-m) + 3\Delta l \cos\left(2\theta - \frac{2}{3}\pi\right)\right\} \times \{2(l-m) + 3\Delta \cos 2\theta\} - \left\{l - m - 3\Delta \cos\left(2\theta + \frac{2}{3}\pi\right)\right\}} \quad (52)$$

where θ: Rotor angle of the motor $$dI(i+j) = \begin{bmatrix} dI_u(i+j) \\ dI_w(i+j) \end{bmatrix} \quad (53)$$

where j=1,2, . . . ,n; $dI_u(i+j)$: First-order difference of phase current of U-phase; and $dI_w(i+j)$: First-order difference of phase current of W-phase $$C = \begin{bmatrix} c(i+1) \\ c(i+2) \\ \vdots \\ c(i+n) \end{bmatrix} \quad (54)$$

$$c(i+j) = \quad (55)$$
$$\begin{bmatrix} -\sin\frac{2}{3}\pi Vh_{wv}(i+j) & Vh_{uv}(i+j)+\cos\frac{2}{3}\pi Vh_{wv}(i+j) & 2Vh_{uv}(i+j)-Vh_{wv}(i+j) \\ -\sin\frac{2}{3}\pi(Vh_{uv}(i+j)-Vh_{wv}(i+j)) & \cos\frac{2}{3}\pi(Vh_{uv}(i+j)+Vh_{wv}(i+j)) & -Vh_{uv}(i+j)+2Vh_{wv}(i+j) \end{bmatrix}$$

where $Vh_{uv}(i+j)$: Interphase voltage of U-phase and V-phase of j-th control cycle in the predetermined period of a periodic signal; and $Vh_{wv}(i+j)$: Interphase voltage of W-phase and V-phase of j-th control cycle in the predetermined period of a periodic signal.

3. A controller of a DC brushless motor having current detecting means for detecting a phase current passing through an armature of a DC brushless motor and an energization control unit for controlling the energization of the motor by determining, for each predetermined control cycle, a drive voltage to be applied to the armature of the motor such that the difference between a phase current detected by the current detecting means and a predetermined desired current is reduced, comprising:

periodic signal superposing means for superposing a periodic signal that causes the total sum of output voltages in a predetermined period including two or more control cycles to become zero over the drive voltage; and rotor angle detecting means for calculating, when the periodic signal has been superposed over the drive voltage, a first-order difference in phase current of the motor between adjoining control cycles, while maintaining the drive voltage during the predetermined period at a constant level, and then calculating a sine reference value and a cosine reference value on the basis of a double angle of the motor by using the first-order difference so as to calculate the rotor angle of the motor on the basis of the sine reference value and the cosine reference value.

4. The controller of a DC brushless motor according to claim 3, wherein the rotor angle detecting means calculates the sine reference value and the cosine reference value according to expressions (56) to (60) given below:

$$\begin{bmatrix} Vs \\ Vc \\ l-m \end{bmatrix} = K \begin{bmatrix} 3\Delta l \sin 2\theta \\ 3\Delta l \cos 2\theta \\ l-m \end{bmatrix} \quad (56)$$

$$= (C^t C)^{-1} C^t \begin{bmatrix} dI(i+1) \\ dI(i+2) \\ \vdots \\ dI(i+n) \end{bmatrix}$$

where Vs: Sine reference value; Vc: Cosine reference value; l: DC component of self inductance of each phase of a motor; m: DC component of mutual inductance between angle phases of the motor; dI(i+1) to dI(i+n) . . . : First-order difference of phase current between adjoining control cycles when n+1 control cycles are included in the predetermined period of the periodic signal; and i: Number of control cycle from which the predetermined period starts $$K = \frac{1}{\left\{2(l-m)+3\Delta l\cos\left(2\theta-\frac{2}{3}\pi\right)\right\} \times \{2(l-m)+3\Delta l\cos 2\theta\} - \left\{l-m-3\Delta\cos\left(2\theta+\frac{2}{3}\pi\right)\right\}} \quad (57)$$

where $\theta$: Rotor angle of motor $$dI(i+j) = \begin{bmatrix} dI_u(i+j) \\ dI_w(i+j) \end{bmatrix} \quad (58)$$

where $j=1,2,\ldots,n$; $dI_u(j)$: First-order difference of phase current of U-phase; and $dI_w(J)$: First-order difference of phase current of W-phase $$C = \begin{bmatrix} c(i+1) \\ c(i+2) \\ \vdots \\ c(i+n) \end{bmatrix} \quad (59)$$

$$c(i+j) = \quad (60)$$
$$\begin{bmatrix} -\sin\frac{2}{3}\pi Vh_{wv}(i+j) & Vh_{uv}(i+j)+\cos\frac{2}{3}\pi Vh_{wv}(i+j) & 2Vh_{uv}(i+j)-Vh_{wv}(i+j) \\ -\sin\frac{2}{3}\pi(Vh_{uv}(i+j)-Vh_{wv}(i+j)) & \cos\frac{2}{3}\pi(Vh_{uv}(i+j)+Vh_{wv}(i+j)) & -Vh_{uv}(i+j)+2Vh_{wv}(i+j) \end{bmatrix}$$

where $Vh_{uv}(i+j)$: Interphase voltage of U-phase and V-phase of j-th control cycle in the predetermined period of a periodic signal; and $Vh_{wv}(i+j)$: Interphase voltage of W-phase and V-phase of j-th control cycle in the predetermined period of a periodic signal.

5. A method for detecting a rotor angle of a DC brushless motor, deemed as an equivalent circuit, which includes a q-axis armature on a q-axis indicating the direction of a magnetic flux of the magnetic field of the motor and a d-axis armature on a d-axis orthogonal to the q-axis, in a motor controller having current detecting means for detecting phase currents passing through armatures of the motor, dq current calculating means for calculating a q-axis current passing through the q-axis armature and a d-axis current passing through the d-axis armature on the basis of the phase currents detected by the current detecting means and a rotor angle of the motor, and energization controlling means for controlling the energization of the motor by determining a d-axis voltage to be applied to the d-axis armature and a q-axis voltage to be applied to the q-axis armature for each predetermined control cycle so as to minimize the difference between a q-axis command current, which is a command value of current passing through the q-axis armature, and a q-axis current and the difference between a d-axis command current, which is a command value of current passing through the d-axis armature, and a d-axis current, the method comprising:

a first step for superposing a periodic signal that causes the total sum of output voltages in a predetermined period including two or more control cycles to become zero over the d-axis drive voltage and the q-axis drive voltage;

a second step for calculating a first-order difference of a d-axis current and a first-order difference of a q-axis current corresponding to a first-order difference of a phase current of the motor between adjoining control cycles in the predetermined period, while maintaining the d-axis drive voltage and the q-axis drive voltage during the predetermined period at a constant level, by using an estimated value of a predetermined rotor angle;

a third step for calculating a sine reference value and a cosine reference value on the basis of the double angle of the phase difference between an actual value of a rotor angle of the motor and an estimated value of the rotor angle, using the first-order difference of the d-axis armature and the first-order difference of the q-axis armature calculated in the second step; and a fourth step for calculating the rotor angle of the motor on the basis of the sine reference value and the cosine reference value calculated in the third step and the estimated value of the rotor angle in the first step.

6. The method for detecting a rotor angle of a DC brushless motor according to claim 1, wherein the sine reference value and the cosine reference value are calculated in the third step according to expressions (61) to (65) given below:

$$\begin{bmatrix} Vs_{dq} \\ Vc_{dq} \\ L0 \end{bmatrix} = \begin{bmatrix} L1\sin 2\theta_e \\ L1\cos 2\theta_e \\ L0 \end{bmatrix} \quad (61)$$

$$= (C_{dq}^t C_{dq})^{-1} C_{dq}^t \begin{bmatrix} dI_{dq}(i+1) \\ dI_{dq}(i+2) \\ \vdots \\ dI_{dq}(i+n) \end{bmatrix}$$

where $Vs_{dq}$: Sine reference value; $Vc_{dq}$: Cosine reference value; $dI_{dq}(i+1)$ to $dI_{dq}(i+n)$ . . . : First-order difference of d-axis current and q-axis current between adjoining control cycles when n+1 control cycles are included in the predetermined period of the periodic signal; and i: Number of control cycle from which the predetermined period starts $$L0 = \frac{1}{L_d} + \frac{1}{L_q}, L1 = \frac{1}{L_d} - \frac{1}{L_q} \quad (62)$$

where $L_d$: Inductance of the d-axis armature; and $L_q$: Inductance of the q-axis armature $$dI_{dq}(i+j) = \begin{bmatrix} dI_d(i+j) \\ dI_q(i+j) \end{bmatrix} \quad (63)$$

where j=1,2, . . . ,n; $dI_d(i+j)$: First-order difference of current passing through the d-axis armature; and $dI_q(i+j)$: First-order difference of current passing through the q-axis armature $$C_{dq} = \begin{bmatrix} c_{dq}(i+1) \\ c_{dq}(i+2) \\ \vdots \\ c_{dq}(i+n) \end{bmatrix} \quad (64)$$

$$c_{dq}(i+j) = \begin{bmatrix} Vh_q(i+j) & Vh_d(i+j) & Vh_d(i+j) \\ Vh_d(i+j) & -Vh_q(i+j) & Vh_q(i+j) \end{bmatrix} \quad (65)$$

where $Vh_d(i+j)$: Output voltage to the d-axis armature in a j-th control cycle in the predetermined period of the periodic signal; and $Vh_q(i+j)$: Output voltage to the q-axis armature in a j-th control cycle in the predetermined period of the periodic signal.

7. A controller of a DC brushless motor, deemed as an equivalent circuit, which includes a q-axis armature on a q-axis indicating the direction of a magnetic flux of the magnetic field of the motor and a d-axis armature on a d-axis orthogonal to the q-axis, having current detecting means for detecting phase currents passing through armatures of the motor, dq current converting means for converting a phase current detected by the current detecting means into a q-axis current passing through the q-axis armature and a d-axis current passing through the d-axis armature, and energization controlling means for controlling the energization of the motor by determining a d-axis drive voltage to be applied to the d-axis armature and a q-axis drive voltage to be applied to the q-axis armature for each predetermined control cycle so as to minimize the difference between a q-axis command current, which is a command value of current passing through the q-axis armature, and a q-axis current and the difference between a d-axis command current, which is a command value of current passing through the d-axis armature, and a d-axis current, comprising:

periodic signal superposing means for superposing a periodic signal that causes the total sum of output voltages in a predetermined period including two or more control cycles to become zero over the d-axis drive voltage and the q-axis drive voltage; and rotor angle detecting means for calculating a first-order difference of a d-axis current and a first-order difference of a q-axis current corresponding to a first-order difference in phase current of the motor between adjoining control cycles in the predetermined period, while maintaining the d-axis drive voltage and the q-axis drive voltage during the predetermined period at a constant level, by using an estimated value of a predetermined rotor angle, and for calculating a sine reference value and a cosine reference value on the basis of the double angle of the phase difference between an actual value and an estimated value of the rotor angle of the motor, using the first-order difference of the d-axis current and the first-order difference of the q-axis current so as to calculate the rotor angle of the motor on the basis of the sine reference value and the cosine reference value and the estimated value of the rotor angle.

8. The controller of a DC brushless motor according to claim 7, wherein the rotor angle detecting means calculates the sine reference value and the cosine reference value according to expressions (66) to (70) given below:

$$\begin{bmatrix} Vs_{dq} \\ Vc_{dq} \\ L0 \end{bmatrix} = \begin{bmatrix} L1\sin 2\theta_e \\ L1\cos 2\theta_e \\ L0 \end{bmatrix} = (C_{dq}^t C_{dq})^{-1} C_{dq}^t \begin{bmatrix} dI_{dq}(i+1) \\ dI_{dq}(i+2) \\ \vdots \\ dI_{dq}(i+n) \end{bmatrix} \quad (66)$$

where $Vs_{dq}$: Sine reference value; $Vc_{dq}$: Cosine reference value; $dI_{dq}(i+1)$ to $dI_{dq}(i+n)$ ... : First-order difference of d-axis current and q-axis current between adjoining control cycles when n+1 control cycles are included in the predetermined period of the periodic signal; and i: Number of control cycle from which the predetermined period starts $$L0 = \frac{1}{L_d} + \frac{1}{L_q}, \quad L1 = \frac{1}{L_d} - \frac{1}{L_q} \quad (67)$$

where $L_d$: Inductance of the d-axis armature; and $L_q$: Inductance of the q-axis armature $$dI_{dq}(i+j) = \begin{bmatrix} dI_d(i+j) \\ dI_q(i+j) \end{bmatrix} \quad (68)$$

where j=1,2, . . . ,n; $dI_d(i+j)$: First-order difference of current passing through the d-axis armature; and $dI_q(i+j)$: First-order difference of current passing through the q-axis armature $$C_{dq} = \begin{bmatrix} c_{dq}(i+1) \\ c_{dq}(i+2) \\ \vdots \\ c_{dq}(i+n) \end{bmatrix} \quad (69)$$

$$c_{dq}(i+j) = \begin{bmatrix} Vh_q(i+j) & Vh_d(i+j) & Vh_d(i+j) \\ Vh_d(i+j) & -Vh_q(i+j) & Vh_q(i+j) \end{bmatrix} \quad (70)$$

where $Vh_d$: Output voltage to the d-axis armature in a J-th control cycle in the predetermined period of the periodic signal; and $Vh_q$: Output voltage to the q-axis armature in a j-th control cycle in the predetermined period of the periodic signal.

* * * * *